(12) United States Patent  (10) Patent No.: US 8,538,319 B2
Nolasco  (45) Date of Patent: Sep. 17, 2013

(54) SYSTEM AND METHOD FOR REAL TIME TRACKING OF STUDENT PERFORMANCE BASED ON STATE EDUCATIONAL STANDARDS

(71) Applicant: Norman J. Nolasco, Houston, TX (US)

(72) Inventor: Norman J. Nolasco, Houston, TX (US)

( * ) Notice: Subject to any disclaimer, the term of this patent is extended or adjusted under 35 U.S.C. 154(b) by 0 days.

(21) Appl. No.: 13/776,857

(22) Filed: Feb. 26, 2013

(65) Prior Publication Data

US 2013/0189666 A1    Jul. 25, 2013

Related U.S. Application Data

(63) Continuation of application No. 11/323,229, filed on Dec. 30, 2005, now Pat. No. 8,385,810.

(60) Provisional application No. 60/640,505, filed on Dec. 30, 2004.

(51) Int. Cl.
   *G09B 3/00*    (2006.01)
(52) U.S. Cl.
   USPC .......................................................... 434/350
(58) Field of Classification Search
   CPC ....................................................... G09B 3/00

USPC .................................. 434/118, 322, 323, 350
See application file for complete search history.

(56) References Cited

U.S. PATENT DOCUMENTS

| | | | |
|---|---|---|---|
| 6,386,883 | B2 | 5/2002 | Siefert |
| 6,533,583 | B1 | 3/2003 | Sportelli |
| 6,643,493 | B2 | 11/2003 | Kilgore |
| 7,311,524 | B2 | 12/2007 | Jennen et al. |
| 2002/0102524 | A1 | 8/2002 | Rizzi et al. |
| 2003/0039944 | A1 | 2/2003 | Grueneberg et al. |
| 2003/0044762 | A1 | 3/2003 | Bergan et al. |
| 2003/0113697 | A1 | 6/2003 | Plescia |
| 2004/0076941 | A1 | 4/2004 | Cunningham et al. |
| 2004/0110119 | A1 | 6/2004 | Riconda et al. |
| 2006/0084048 | A1 | 4/2006 | Sanford et al. |

*Primary Examiner* — Kesha Y. Frisby
(74) *Attorney, Agent, or Firm* — Howison & Arnott, LLP

(57) ABSTRACT

A system for providing feedback on educational standards within schools includes an interface providing access to a plurality of established educational standards which may be downloaded into a database of the system. A plurality of control modules enables a user to establish educational programs specifically associated with at least one of the downloaded established educational standards and receive feedback on student performance. Real time reports on student performance are provided responsive to the received feedback on student performance.

19 Claims, 20 Drawing Sheets

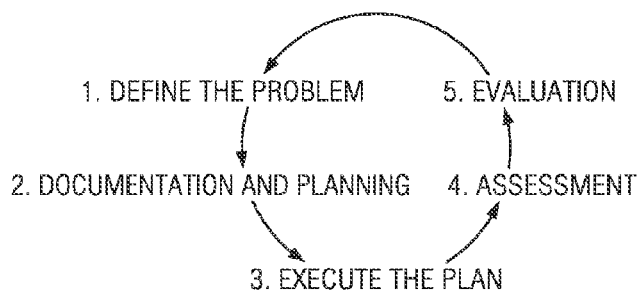
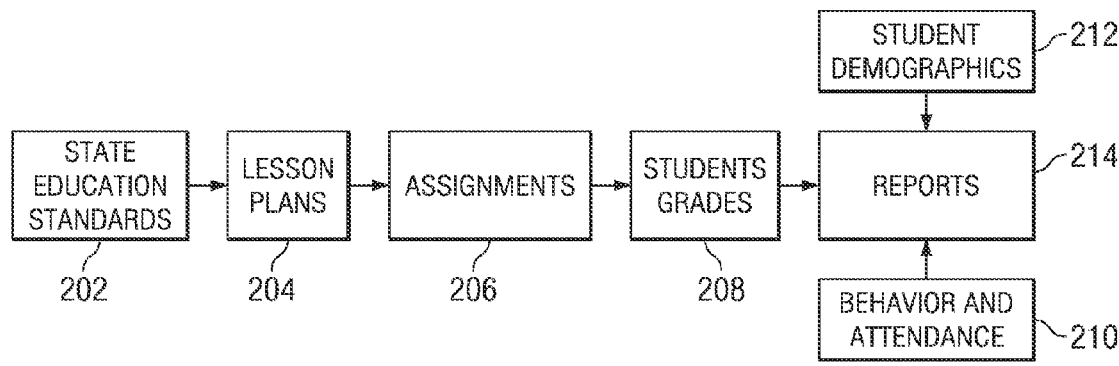
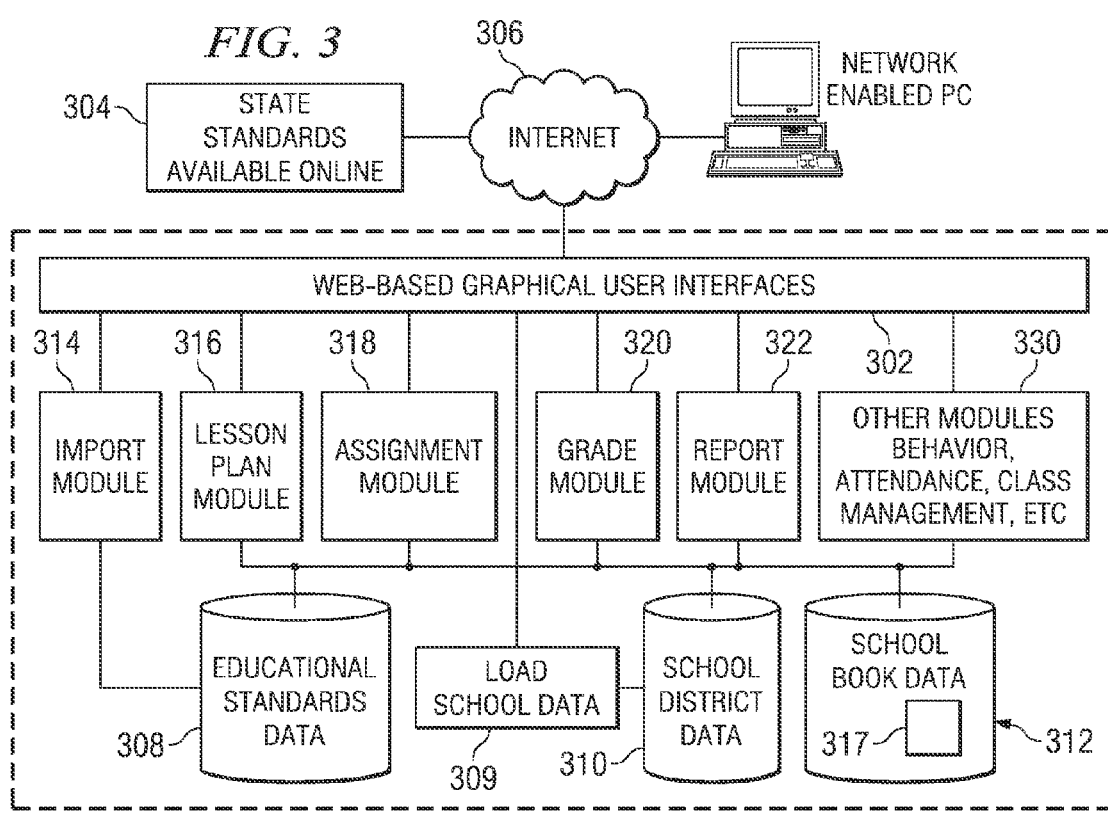

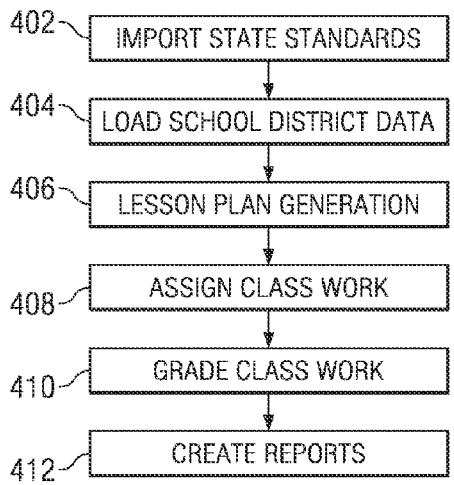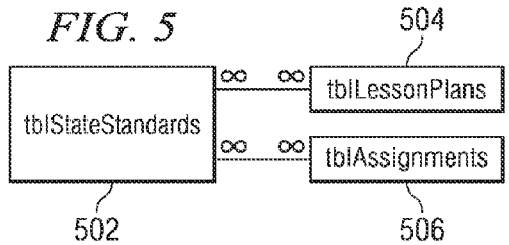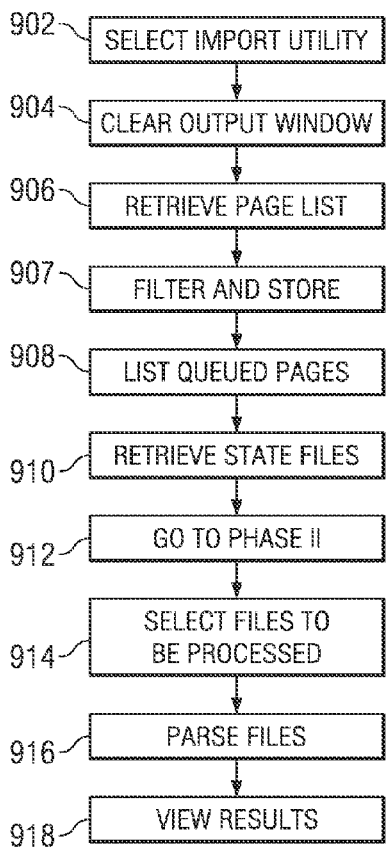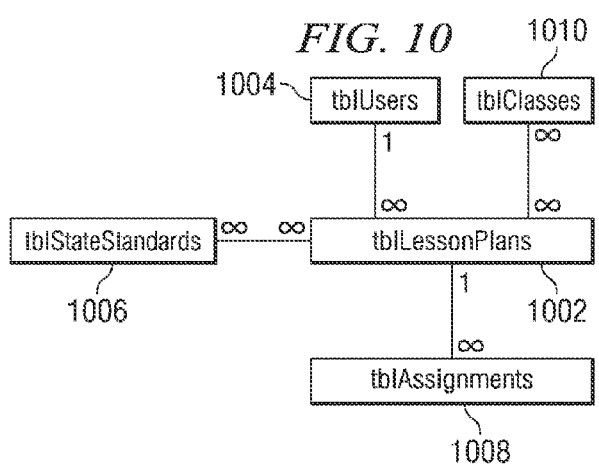

FIG. 11

| NetISD by Advarion Incorporated | | | | Monday, January 5, 2004 test.norm logged in |
|---|---|---|---|---|

ADVARION

Teachers | School Administrators | Settings | System Control | Account | Log Out Home: Lesson Plans Search Filters 1102 — Section [Show Any Lesson Plan Section ▼] — 1104

1106          1108

Search [           ]     Status [Show All ▼]   [Search] [Clear]

Found 31 matches. [1-15] Page [1 ▼] of 3

1114

[ADD NEW]

| | Status | Lesson Plan | Last Modified | Delete |
|---|---|---|---|---|
| 1116 → 1110 → ☐ | Inactive | All Quiet on the Western Front<br>Students will view realities and personal feelings of the war through usage of the movie. Character analysis will also be available. | 1/21/2004 12:53:29 PM | X |
| ☐ | Active | AP Chapter 23 – Reconstruction<br>Continuing lecture on Johnson and the Radical Reconstruction | 11/30/2003 5:15:01 PM | X |
| ☐ | Active | AP-Corners-chapters 17-23<br>Corners quiz (In Class) using the corners of the room as a, b, c, d Civil War through the Reconstruction | 12/2/2003 2:03:29 PM | X |
| ☐ | Inactive | APUSH Era's Presentation<br>Students will give the presentation portion of their Era's | 3/5/2004 6:24:24 AM | X |

1112

Done                                                                                    Internet

*FIG. 12a*

```
NetISD by Advarion Incorporated                            _ □ ×

ADVARION                              Monday, January 5, 2004
                                              test.norm logged in Teachers | School Administrators | Settings | System Control | Account | Log Out
```

Home: Lesson Plans: Lesson Plan Details

[ADD NEW]  [SAVE]  [CANCEL]

Basic Information                               1202
Title*
[All Quiet on the Western Front]
                                                    1204
Synopsis* (300 char max)
[Students will view realities and personal
feelings of the war through usage of
the movie. Character analysis will also
be available.]

Miscellaneous  1206
Status*
[Inactive ▼]

Share Lesson Plan
☑ Yes, share this Lesson Plan
    with other Teachers.
1208
Created
12/7/2003 7:04:49 PM — 1210

Last Modified
1/21/2004 12:53:29 PM — 1212

Lesson Plan Section and State Standards           1214
Primary Lesson Plan Section
[(27 Lesson Plans) 113.32: United States History Studies Since Reconstruction (One Credit). ▼]

| Associated State Standards | | [ADD] |
|---|---|---|
| TEKS | State Standard | Remove |
| 113.32 c1C | 113: TEKS for Social Studies<br>   Subchapter C. High School<br>     113.32: United States History Studies Since<br>     Reconstruction (One Credit).<br>       c. Knowledge and skills<br>         1. History. The student understands traditional<br>         historical points of reference in U.S. history from<br>         1877 to the present. The student is expected to:<br>1216        C. explain the significance of the following dates:<br>         1898, 1914-1918, 1929, 1941-1945, and 1957. | X |

TO FIG. 12b

FROM FIG. 12a

Lesson Plan Detail
Objectives                                          1218

| View Trench warfare as discussed in a previous lesson |

Methods

| Video Excerpts                1220 |

Concepts

| Trench warfare
homefronts                     1222
conscription |

Assessment

| WS included in the lesson
Character analysis handout |

Resources

|  |

Notes

| Use Essay Question as part of exam |

| Lesson Plan Internet Links | [ADD] |
| Link | Remove |
| This Lesson Plan does not have any associated links. | |

[ADD NEW]  [SAVE]  [CANCEL]

Done                                    Internet

*FIG. 12b*

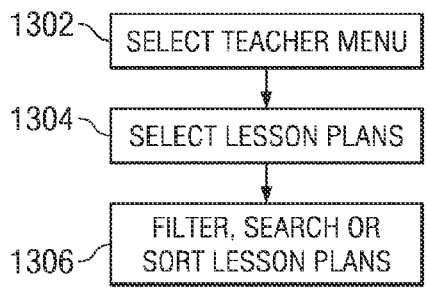
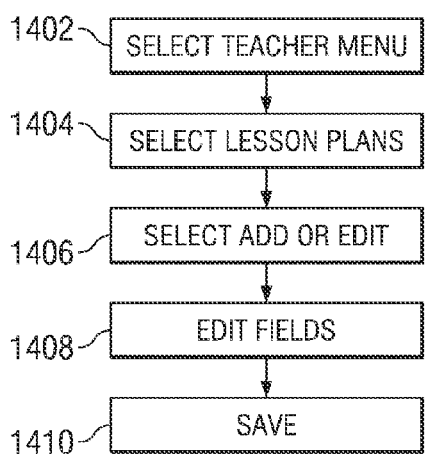
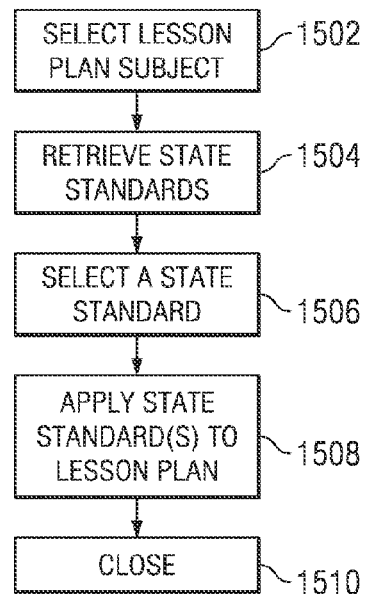
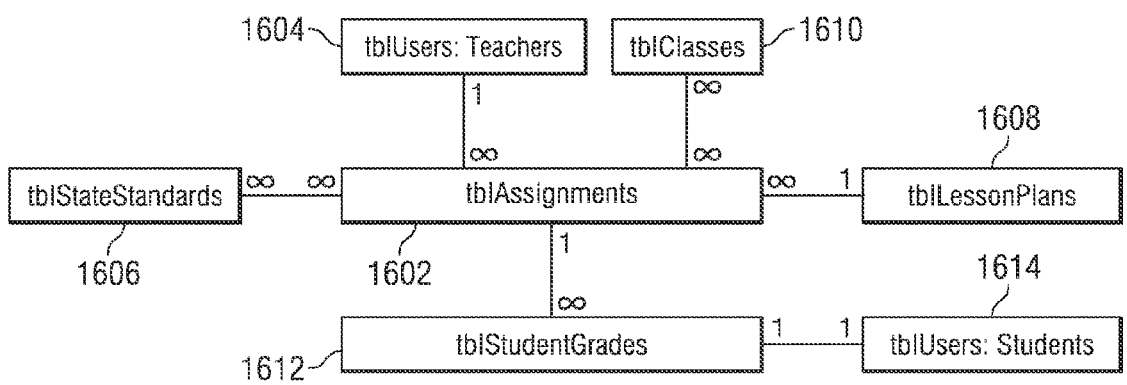

FIG. 17

NetISD by Advarion Incorporated

ADVARION

Monday, January 5, 2004
test.norm logged in

Teachers | School Administrators | Settings | System Control | Account | Log Out Home: Class List

General Information

| | |
|---|---|
| Teacher | J Doe | ← 1702
| Semester | Spring 2004 | ← 1704
| Grading Per | 4th Grading Period | ← 1706
| Class | U.S. History AP |
| Period | Period 2 |

Class Information

| | |
|---|---|
| Teachers | J Doe |
| Synopsis | The United States History Program is designed to provide students with the analytical skills and factual knowledge neces.... |

1712 → ← 1708

1710 →

| Period | Class Information | | Assignments | Attend |
|---|---|---|---|---|
| | | | | 1714  1716 |
| Period 1 | U.S. History<br>*Instructor(s): J Doe* | | B | 83.6% | 90.0% |
| Period 2 | U.S. History AP<br>*Instructor(s): J Doe* | | B | 88.1% | 98.5% |
| Period 3 | U.S. History<br>*Instructor(s): J Doe* | | C | 77.2% | 92.9% |
| Period 4 | U.S. History<br>*Instructor(s): J Doe* | | B | 83.9% | 96.0% |

Done — Internet

FIG. 18

NetISD by Advarion Incorporated

ADVARION

Monday, January 5, 2004
test.norm logged in

Teachers | School Administrators | Settings | System Control | Account | Log Out Home: Class List: Assignments

| General Information 1804 1803 | | Assignment Filter | 1836 |
|---|---|---|---|
| Roster | 12 Students [view] — 1806 | Grd Per — 1838 | 4th Grading Period ▼ Graded Show All ▼ — 1844 |
| Semester | Spring 2004 — 1806 | Assigned — 1840 | Show All ▼ Due Show All ▼ — 1846 |
| Class | U.S. History — 1808 | Search — 1842 | Types Show All ▼ — 1848 |
| Period | Period 1 — 1810 | | Search Clear — 1852 |
| Instructor(s) | J Doe | 1850 1824 1826 1828 | |

1802
1814
1818

[VIEW GRADEBOOK]                                           [ADD NEW ASSIGNMENT] — 1834
                                                                                — 1830

| Graded | Assignment | Scoring | Assigned | Due | Delete |
|---|---|---|---|---|---|
| YES | Map WWII (MAP2) Asgn Type–Students will color the Axis powers red, Allied powers yellow and all the neutral countries green. Don't forget to mark an x in all countries occupied by Germany at any time. [Details \| Grade Assignment] — 1822 | Max: 50.00 | 3/8/2004 | 3/9/2004 | X — 1832 |
| YES | TEST CHAPTER 19– WORLD WAR TWO (T-19) | Max: 100.00 | 3/8/2004 | 3/10/2004 | X |

1820
1816

Done                                                                                    Internet

| NetISD by Advarion Incorporated | _ □ × |

ADVARION  Monday, January 5, 2004
test.norm logged in

Teachers | School Administrators | Settings | System Control | Account | Log Out Home: Class List: Assignments: Grade Assignment

| General Information | | Assignment Details | |
|---|---|---|---|
| Roster | 12 Students [view] | Name | Map WWII [MAP2] |
| Semester | Spring 2004 | Type | Asgn Type |
| Class | U.S. History | Due Date | 3/9/2004 |
| Period | Period 1 | Graded | ☑ This assignment has been graded. |
| Instructor(s) | J Doe | Maximum | 50 points |

[SAVE] [CANCEL]   2502   [SET GRADE MAX] [SET GRADE MIN] [TURN IN]   2518
2504   2506   2508  2510   2512  2520  2514   2522  2516   2524

| Student Name | Average | Grade | Late | Turned In | Exempt | Notes |
|---|---|---|---|---|---|---|
| Sample, Student 01 | 70.81 | 25.0 | ☐ | ☑ | ☐ | |
| Sample, Student 02 | 84.42 | 46.0 | ☐ | ☑ | ☐ | |
| Sample, Student 03 | 86.29 | 46.0 | ☐ | ☑ | ☐ | |
| Sample, Student 04 | 53.65 | 46.0 | ☐ | ☑ | ☐ | |
| Sample, Student 05 | 64.69 | 0.0 | ☐ | ☑ | ☐ | |
| Sample, Student 06 | 91.12 | 50.0 | ☐ | ☑ | ☐ | |
| Sample, Student 07 | 84.81 | 25.0 | ☐ | ☑ | ☐ | |
| Sample, Student 08 | 66.47 | 25.0 | ☐ | ☑ | ☐ | |
| Sample, Student 09 | 79.88 | 46.0 | ☐ | ☑ | ☐ | |
| Sample, Student 10 | 75.05 | 50.0 | ☐ | ☑ | ☐ | |
| Sample, Student 11 | 68.44 | 40.0 | ☐ | ☑ | ☐ | turned in late, 10 point deduction |
| Sample, Student 12 | 80.18 | 50.0 | ☐ | ☑ | ☐ | |

[SAVE] ~2526  [CANCEL] ~2528

Done                                       Internet

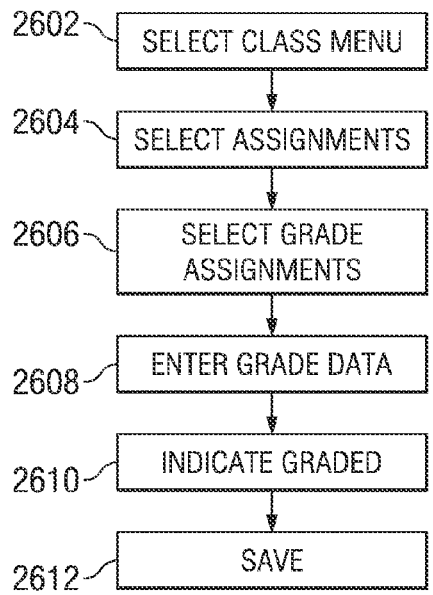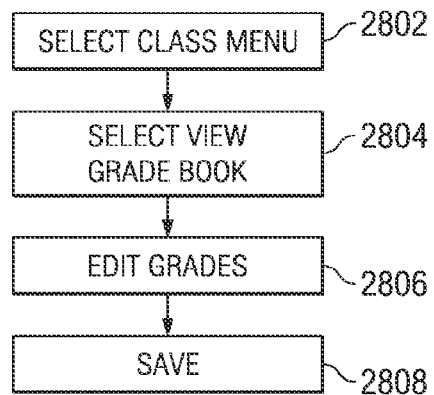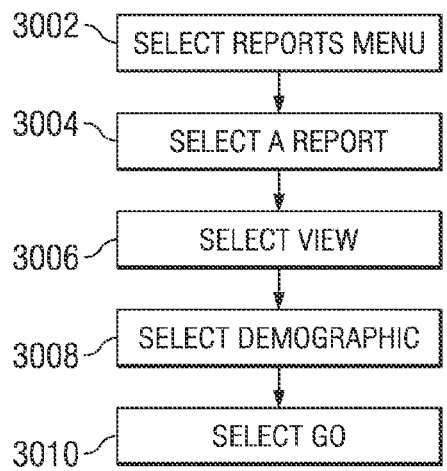

FIG. 27

| Gradebook: U.S. History|1 | | | | | | | | |
|---|---|---|---|---|---|---|---|---|---|
| General Information | | | | | Grade Summary | | | | |
| Class | U.S. History | Semester | Spring 2004 | | Assignments | Grade 28 out of 30 | | | |
| Instructor(s) | J Doe | Period | Period 1 | | Class Average | 83.59% | | | |

2702 2704 2706 2708

| | | 5/12/2004 | 5/12/2004 | 5/11/2004 | 5/7/2004 | 5/7/2004 | 5/7/2004 | 4/30/2004 | 4/28/2 |
|---|---|---|---|---|---|---|---|---|---|
| Due Date | | AT | AT | AT | AT | AT | AT | AT | AT |
| Assignment Type | | REV-12 | WHO-1 | MOVIE? | MV-3 | CE | TEST22 | CE4/30 | MOVI |
| Assignment Code | | 40pts | 40pts | 16pts | 10pts | 25pts | 100pts | 25pts | 10pt |
| | AVG | | | | | | | | |
| Sample, Student 01 | 83.10 | 0 | 31 | 12 | 10 | X | 90 | 24 | |
| Sample, Student 02 | 86.55 | 0 | 36 | 14 | 10 | 25 | 72 | 25 | |
| Sample, Student 03 | 88.47 | 0 | 36 | 13 | 10 | 25 | 74 | 25 | |
| Sample, Student 04 | 72.73 | 0 | 16 | X | 10 | 5 | X | X | |
| Sample, Student 05 | 75.58 | 0 | 29 | 12 | 10 | 25 | 75 | 24 | |
| Sample, Student 06 | 93.43 | 0 | 33 | 19 | 10 | 23 | 88 | 24 | |
| Sample, Student 07 | 86.96 | 0 | 38 | 15 | 10 | 25 | 95 | 24 | |
| Sample, Student 08 | 76.68 | 0 | 36 | 16 | 10 | 23 | 70 | 24 | |
| Sample, Student 09 | 93.75 | 0 | 36 | 13 | 10 | 25 | 92 | X | |
| Sample, Student 10 | 85.60 | 0 | 8 | 15 | 10 | 25 | 84 | 24 | |
| Sample, Student 11 | 78.07 | 0 | 33 | 15 | 10 | 24 | 70 | 24 | |
| Sample, Student 12 | 82.20 | 0 | 28 | 16 | 10 | 24 | 59 | 24 | |
| Assignment Average | 83.59 | 0.00 | 30.00 | 14.55 | 10.00 | 22.64 | 79.00 | 24.20 | 9 |

Close Window

| TEKS Section | AFRAM Males | | AFRAM Females | | ASIAN Males | | ASIAN Females | | HISPA Males | | HISPA Females | | NATAM Males | | NATAM Females | | WHITE Males | | WH Fem | |
|---|---|---|---|---|---|---|---|---|---|---|---|---|---|---|---|---|---|---|---|---|
| | n | Avg | n | Avg | n | Avg | n | Avg | n | Avg | n | Avg | n | Avg | n | Avg | n | Avg | n |
| 110.43 | 12 | 66.2% | 0 | 0.0% | 0 | 0.0% | 0 | 0.0% | 84 | 75.3% | 41 | 74.4% | 0 | 0.0% | 0 | 0.0% | 964 | 73.9% | 995 |
| 110.44 | 0 | 0.0% | 0 | 0.0% | 0 | 0.0% | 0 | 0.0% | 0 | 0.0% | 0 | 0.0% | 0 | 0.0% | 0 | 0.0% | 41 | 89.8% | 28 |
| 110.45 | 152 | 80.6% | 0 | 0.0% | 95 | 57.7% | 0 | 0.0% | 342 | 80.1% | 247 | 72.2% | 0 | 0.0% | 0 | 0.0% | 2996 | 78.4% | 2339 |
| 111.33 | 0 | 0.0% | 0 | 0.0% | 0 | 0.0% | 0 | 0.0% | 0 | 0.0% | 0 | 0.0% | 0 | 0.0% | 0 | 0.0% | 70 | 86.3% | 44 |
| 111.34 | 0 | 0.0% | 0 | 0.0% | 0 | 0.0% | 0 | 0.0% | 193 | 59.1% | 538 | 70.2% | 0 | 0.0% | 0 | 0.0% | 6078 | 72.1% | 8031 |
| 111.35 | 0 | 0.0% | 0 | 0.0% | 0 | 0.0% | 0 | 0.0% | 19 | 72.1% | 0 | 0.0% | 0 | 0.0% | 0 | 0.0% | 387 | 82.4% | 303 |
| 111.54 | 0 | 0.0% | 0 | 0.0% | 0 | 0.0% | 0 | 0.0% | 2 | 85.0% | 0 | 0.0% | 0 | 0.0% | 0 | 0.0% | 11 | 85.5% | 24 |
| 118.2 | 13 | 100.0% | 0 | 0.0% | 13 | 0.0% | 116 | 96.6% | 26 | 100.0% | 26 | 100.0% | 0 | 0.0% | 0 | 0.0% | 221 | 87.4% | 156 |
| 112.43 | 0 | 0.0% | 0 | 0.0% | 0 | 0.0% | 0 | 0.0% | 531 | 72.1% | 363 | 64.4% | 531 | 79.8% | 0 | 0.0% | 1493 | 82.0% | 1380 |
| 112.45 | 0 | 0.0% | 0 | 0.0% | 186 | 61.1% | 0 | 0.0% | 531 | 72.1% | 363 | 64.4% | 0 | 0.0% | 0 | 0.0% | 6483 | 76.4% | 6062 |
| 112.47 | 0 | 0.0% | 0 | 0.0% | 0 | 0.0% | 0 | 0.0% | 189 | 66.8% | 0 | 0.0% | 0 | 0.0% | 0 | 0.0% | 3213 | 75.4% | 3591 |

SYSTEM AND METHOD FOR REAL TIME TRACKING OF STUDENT PERFORMANCE BASED ON STATE EDUCATIONAL STANDARDS

CROSS-REFERENCE TO RELATED APPLICATION

This application is a Continuation of U.S. patent application Ser. No. 11/323,229, filed Dec. 30, 2005, and entitled SYSTEM AND METHOD FOR REAL TIME TRACKING OF STUDENT PERFORMANCE BASED ON STATE EDUCATIONAL STANDARDS, which application claims priority from U.S. Provisional Application 60/640,505, filed Dec. 30, 2004, and entitled "REAL-TIME ASSESSMENT OF STUDENT PERFORMANCE BASED ON STATE EDUCATION STANDARDS."

TECHNICAL FIELD OF THE INVENTION

The present invention relates to the assessment of educational performance within a school district, and more particularly, to real time assessment of performance with respect to established educational standards.

BACKGROUND

A standard assessment and accountability system (SAAS) allows those involved in the educational process to measure their performance against a particular standard and take corrective action where necessary. Examples of these types of systems include the No Child Left Behind Act which builds on the framework of standards based educational reform and sets more specific testing and accountability requirements for the states. The No Child Left Behind Act of 2001 was passed to promote improvements to the American educational system. The purpose of the law was to ensure that all children have a fair, equal and significant opportunity to obtain a high quality education and reach, at a minimum, proficiency on challenging state academic achievement standards and state academic assessments. Among its provisions, the No Child Left Behind Act promotes increased empowerment and involvement by law makers, administrators, teachers, students and parents. The Act also provided for accountability for student performance and annual academic assessment of student performance.

The overall strategy of the Act is to identify successes and failures in the educational system via a yearly assessment test. The testing results are provided to everyone from parents and students to district administrators and state officials. Individual choices can be made to improve each student's education at different levels in the following manners. Parents have the option to move their children out of a failing school and into a more successful school, receive tutoring, or attend after school programs at the cost of their school district. Schools can provide professional development funding to teachers in need of improvement. District administrators can ensure that every student demographic is provided an equal, high quality education. The state agencies can reallocate funds to target areas such as dropout prevention programs and intervention programs for delinquent, neglected and at risk youth. Additional funding awards can be provided to schools showing marked improvement.

Examples of these assessment programs within the states include, for example, the Texas Assessment of Knowledge and Skills (TAKS). TAKS is a testing program that replaced the Texas Assessment of Academic Skills Test. Texas Essential Knowledge and Skills (TEKS) are the center of the curriculum and define the basic content of the instructional and assessment programs in the State of Texas. TEKS outlines the knowledge and skills required of every student on the Texas Assessment of Knowledge and Skills test. The successful implementation of the TEKS is dependent upon school staff having a thorough understanding of the TEKS and the relationship to the Texas Assessment of Knowledge and Skills test. Student achievement on the TAKS is best assured by high quality classroom instruction with a TEKS focus. Of course, while the present example is with respect to a Texas educational standard, any state standard may be used.

Currently, student performance is measured at the end of the school term via the TAKS testing program. There is no method for students, parents, teachers or school administrators to know which TEKS have been covered in class or to what extent, how well students understand the course materials, whether daily assignments are applicable and are focused on specific TEKS areas, whether any problem areas or subjects need to be revisited, whether there is an instructor issues, classroom problem, textbook problem or student learning disability, and whether there is an issue with behavior control or attendance. The onus to educate students and correct any problems in the learning process remains with the instructor, parents and school administrators. However, these problem areas cannot be corrected if they are not known. Each step of the educational process cannot be improved if it cannot be measured.

One problem with assessment testing such as the TAKS program is that the assessment tests are only performed once a year. Standards based assessment testings are normally administered a maximum of once a year because they can be physically and emotional stressful to the students. Students are also required to spend a significant amount of time preparing for both the test subjects and in test taking practices. The tests are normally administered over a three to five day period and depending upon a school's policy, students may not be allowed to progress to a next grade level based on their test performance. Thus, an entire year of school work could be nullified by a single bad day.

The assessment tests may also be time consuming and disruptive. Normal school activities will be disrupted due to the several days required for completion of the test. School is additionally disrupted by the time before a scheduled assessment test required to prepare the students on test taking strategies and practice tests rather than on test subject material. The tests are also financially costly due to the salaries needed to be paid to teaching staff and test proctors, the payment for the testing materials, payment for the scoring process and for the reporting process. Another problem with annual assessment tests are that they may be skewed by indifference, cheating or poor proctoring. Cheating students and poor proctoring practices during the administration of the test can cause inaccurate results to be achieved. Also, many students do not take the assessment test seriously since they have no bearing on their normal school grades.

Thus, the standards assessment and accountability concept for improving education is not as successful as it might be for a number of reasons. The long test cycle enables tests to only be administered once per year. This assessment process normally occurs during the end of the year when it is too late to improve student performance. Thus, underperforming students are not identified until the end of the school year. While using the testing results, adjustments may be made to the curriculum and teaching methods, these changes may only be administered in the following year's students. While parents are provided with the assessment results at the end of the school year, it is too late for parents to intervene to help improve their child's performance. Since the single assessment test is the only source of data to ascertain the breadth and depth of a student's knowledge, when students are indifferent, cheat or simply have a bad day, the test scores may be skewed and not reflect the true measure of the student's performance.

Assessment tests are also one dimensional. They only provide a measurement of the student's knowledge at the end of the school year. Many other determining factors are not taken into consideration, such as daily assignment grades, student attendance and behavior, documented coverage of all applicable state standards, concepts taught in the classroom, adequate amount of class assignments relating to state standards concepts, performance per teacher per classroom and the combination of environmental, demographic and all of the above data.

The standards assessment and accountability concept also does not address day-to-day school activities and does not measure the individual performance of teachers and school administrators. Thus, it is difficult to implement any type of accountability procedures based upon test results. Finally, since parents only receive test results at the end of the school year, they do not have the ability to help their children target their most difficult subjects.

Thus, there is a need to provide a more up-to-date real time assessment of how individual students are performing with respect to established educational standards.

SUMMARY

The present invention disclosed and claimed herein, in one aspect thereof, comprises a system for providing feedback on educational standards within schools. The system includes an interface for providing access to a plurality of established educational standards. At least one database within the system stores the established educational standards which have been downloaded through the interface. A plurality of control modules enable a user to establish educational programs specifically associated with at least one of the downloaded educational standards. The control modules further receive feedback on student performance and provide real time reports on student performance responsive to the received feedback.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates the standards assessment and accountability system feedback cycle;

FIG. 2 illustrates an overview of the associated data used by the tracking system;

FIG. 3 is a functional block diagram of the tracking system;

FIG. 4 is a flow diagram illustrating the operation of the tracking system;

FIG. 5 illustrates the linkage between the state educational standards and other data tables;

FIG. 9 illustrates the linkage of lesson plan tables to various other data tables within the tracking system;

FIG. 10 is a flow diagram illustrating the process for downloading state educational standards into the tracking system;

FIG. 11 is a graphical user interface indicating a lesson plan summary;

FIGS. 12a and 12b are a graphical user interface of the lesson plan edit view;

FIG. 13 is a flow diagram illustrating the process for viewing an existing lesson plan;

FIG. 14 is a flow diagram illustrating the process for creating or editing a lesson plan;

FIG. 15 is a flow diagram illustrating the process for linking a state standard to a particular lesson plan;

FIG. 16 illustrates the linkage of the assignments data table to various other data tables in the tracking system;

FIG. 17 is a graphical user interface of the teacher class list;

FIG. 18 is a graphical user interface of the assignment list;

FIGS. 19a and 19b are a graphical user interface of the assignment edit window;

FIG. 25 is a graphical user interface of the grade entry by assignment screen;

FIG. 26 is a flow diagram illustrating the process for entering grades through the assignment screen;

FIG. 27 is a graphical user entry of the grade entry by class screen;

FIG. 28 is a flow diagram describing the process for grade entry using the class grade book screen;

FIG. 29 illustrates a sample demographics report;

FIG. 30 is a flow diagram illustrating the manner for creating a particular report;

DETAILED DESCRIPTION

Figure 3A:
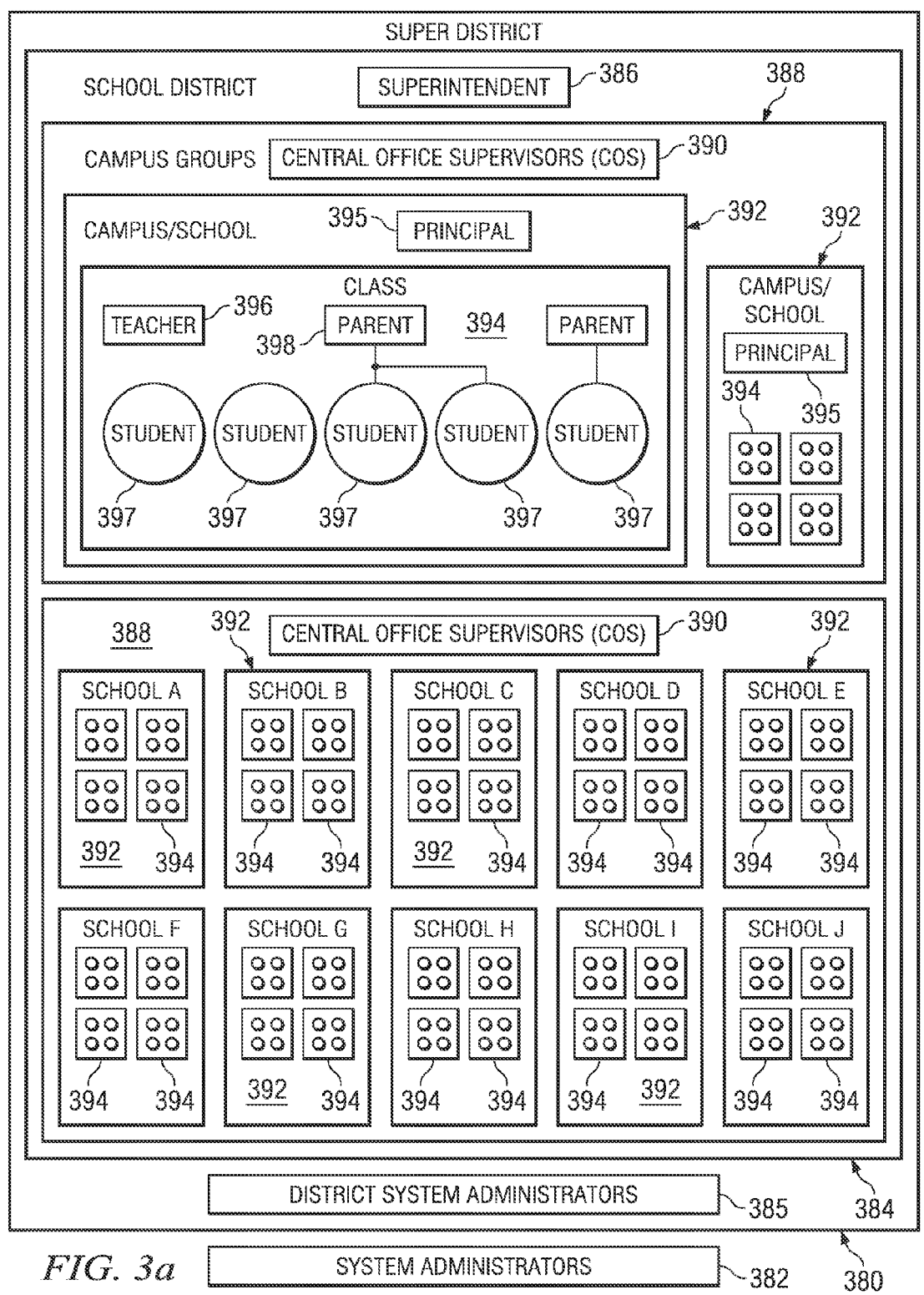
FIG. 3a illustrates the Roles and Domains structure of the school district database.

Referring now to the drawings, and more particularly to FIG. 1, there is illustrated the feedback cycle for a standards assessment and accountability system. The idea of a standards assessment and accountability system (SAAS) is a new concept in education reform. However, this type of feedback process has been established for decades in other industries such as medicine, business and engineering. The process overall includes the first step of defining the problem. The second step involves documentation and planning. The third step involves execution of the plan while the fourth step involves assessment of the executed plan. Finally, the overall plan is evaluated at step five.

Generally, the first step is to define the challenge to be met or the problem to be solved. This step focuses future efforts to the problem at hand. In terms of education, the challenge is upon each teacher to impart specific knowledge and skills to students by the end of the school year. Prior to programs such as No Child Left Behind, classroom curriculum was primarily defined by individual teachers with some guidance from the school districts. The No Child Left Behind Act requires each state to define their own educational standards. This set of standards is essentially a checklist of material to be covered in the classroom and is organized by grade level and subject matter.

Once the problem has been sufficiently defined, the next step is to document and plan execution of the solution to correct the defined problem. The individual steps are documented, and a process to accomplish the goals is created. Documentation is commonly the most neglected step. However, documentation will allow others to reproduce and possibly improve upon previously created processes. In some cases, the documentation may also be required for an auditing process.

While the No Child Left Behind Act does not require formal documentation, it does state that the curriculum must be based on the state's educational standards. Ideally, teachers and administrators will record their teaching message, material covered and other relevant information throughout the school year. Most teachers create a lesson plan for their personal use as a guide for the day's class activities. Next, after the creation of documentation and planning with respect to a particular problem, the work involved in executing the process is performed at step three. For most processes, this is most laborious and time intensive step. Teachers are required to execute their lesson plans and administer tests periodically. Parents have some level of involvement, but are largely limited to review of progress reports or the occasional test score. Interaction and exchange (or collaboration) between parents and teachers is usually done via scheduled conferences. Additionally, many teachers and parents use e-mail to interact with each other on a more frequent basis. Assessment plans such as the No Child Left Behind Act do not directly address aspects of day-to-day operations of the school. The Act leaves most of the control to the school districts and their state agencies.

The assessment step involves collecting the results or product of an executed plan and comparing these with previous results or against predetermined standards. The No Child Left Behind Act requires states to administer annual assessment tests. Each test question addresses specific state standards with respect to a student's grade level and a subject. The definition of success or failure is left to the state to determine. After assessment, the evaluation step involves examining the results obtained in the assessment step. The process can be cycled back to the definition of the problem step based upon the evaluations made in the evaluation step. The evaluation step enables successful processes and areas needing improvement to be identified. With this new information, the overall process can be improved to achieve better results.

Although the No Child Left Behind Act allows states to create their own standards and their own definitions for achievement, it provides measures to reward success and sanction failure as an incentive to improve the educational process. Results obtained at the end of the school year via assessment testing can be used to improve teaching methods for the following year's students.

Referring now to FIG. 2, there is illustrated an overview of all of the associated data which must be managed within an assessment test feedback environment. The state educational standards 202 comprise the standards and criteria established by a state with respect to each student's grade level and the subject matter which the student is studying. The state educational standards 202 are used as a guide for creating the lesson plans 204 by which particular subject matter will be taught by the teachers to the student in their class. These lesson plans 204 are created by the individual teachers and stored within the system. The lesson plans 204 may be accessed by other teachers as a guide for teaching subject matter to the students. The stored and accessible lesson plans 204 makes it possible to assess particular teaching methodologies which have been particularly successful in teaching subject matter to students. The assignments data 206 comprises the actual assignments that are assigned to the students in order to achieve the state educational standards 202 that are implemented within particular lesson plans 204. As with the lesson plans 204, the storing of the assignment data 206 enables a repository of assignments 206 that may be utilized by other parties when particular assignments 206 have proven effective in teaching particular subject matter.

Student grade data 208 comprises the grades of the students that they receive responsive to completion of the provided assignments 206. The student grade data 208 is, of course, the first objective measure of how a student is learning a particular subject matter defined by the state educational standards 202. The student grade data 208 may be combined with other data in providing real time assessment of student performance. The student demographic data 212 provides individualized information on the students being taught within a school district. This can provide information such as ethnicity, socioeconomic class and other important types of demographic data that may be used to analyze student achievement with respect to the subject matters being taught them. The behavior and attendance data 210 provides individualized information with respect to behavioral problems that may be arising with respect to particular students and also provides attendance information for the students. This type of information would be relevant to an analysis of student performance since students that are not attending class and performing poorly could have the poor performance attributed to the lack of attendance rather than any failure in the lesson plans 204 or assignments 206 being assigned by a teacher. Similarly, behavioral information would likewise point out a potential reason for poor performance.

The reports data 214 combines the student grade data 208, the behavior and attendance data 210 and the student demographic data 212 to create an overview of a student's performance in real time. The reports could be continuously updated responsive to new information placed within the student grade data 208, behavior and attendance data 210 and student demographic data 212, and the reports may be accessed in real time by teachers, parents, students and school administrators to provide an up-to-date measuring stick of student performance with respect to various state educational standards 202.

Referring now to FIG. 3, there is illustrated an overall functional block diagram of the components of the real time tracking system of the present disclosure. The tracking system platform 302 includes and provides the ability to access all of the stored data and control modules of the tracking system. This includes state educational standards 202, the lesson plans 204, the assignments 206, the student grade data 208, student demographic data 212 and behavior and attendance data 210 described previously with respect to FIG. 2. In addition to providing the ability to access and manipulate all of this data, the tracking system platform 302 provides web-based graphical user interfaces and provides the ability to externally access the state educational standards website 304 via the Internet 306. The various functional modules described with respect to FIG. 3 are all contained within the tracking system application platform 302. The tracking system platform 302 controls all aspects of module registration, application structure, security and permissions.

Databases accessible via the assessment platform 302 include the educational standards database 308. The educational standards database 308 comprise all of the state standards that are downloaded from the state standards website 304. The information comprises each of the standards associated with particular grade levels and subject matter which the students must accomplish. While the present disclosure is described with respect to state educational standards, any established standards at any level of educational control may be used. School district database 310 includes school district and student specific information. This information includes such things as the student demographics 212 and the behavior and attendance information 210 that is tracked and maintained by the school district. An additional database 312 includes other types of data such as the lesson plan information, assignment information and grade information. While this information is described with respect to a single database 312, all of the data may be stored in separate databases or, alternatively, the information could be compiled within a single database with the educational standards data, the school district data and the lesson plan, assignment and grade data.

An import module 314 assists in the importation of the state standard information from the state standard website 304 for storage within the educational standards database 308. The load school data module 309 enables the districts and schools information to be loaded into the system. The school data consists of all information from class schedules to student rosters. The most basic school data required for minimal operation of the tracking system platform 302 would include, but is not limited to, district information, school information, school-district relationship, all system users, user-district relationships, user-school relationships, system user rules (teacher, student, parent, etc.), parent-student relationships, student information (demographics, birth date, etc.), teacher information, (demographics, certifications, etc.), class information, teacher-class relationships, student-class relationship. The school district database 310 accepts data from a variety of sources including xml files, Microsoft Access, Microsoft SQL, Oracle, csv files and propriety data formats. Although there are a few standard formats for school data, the process of downloading data to the school district database 310 is usually a customized process from district to district. At times, schools within the same district store their data via entirely different methods and large amounts of database work must be done to load the data into the school district database 310.

The lesson plan module 316 enables the teacher to create and save lesson plans for teaching various requirements of the state educational standards stored within the educational standards database 308. A lesson plan may be defined and established with respect to a particular educational standard and saved such that the lesson plan may be accessed in the future by the teacher creating the lesson plan. Additionally, saving the lesson plan enables it to be accessed by other teachers when creating their own lesson plans. The lesson plan module 316 enables individual teachers on a regular basis to prepare lesson plans throughout the school year. Most teachers currently create lesson plans in an ad hoc manner. Methods for creating lesson plans vary from teacher to teacher. The lesson plan module 316 contains a standardized form for creating lesson plans. These lesson plans can then be associated directly with one or more state educational standards. By creating and using lesson plans within the lesson plan module 316, teachers may refer to the lesson plan module for guidance to help focus on a specific subject matter and ensure concepts are completely taught in class. Parents and school administrators are given insight into the documentation of the planned activities within the classroom. The lesson plans act as a link between the state educational standards and the actual work assigned in class for grading. When lesson plans are created within the lesson plan module 316, teachers can choose to share them with other teachers within the system. When lesson plans are shared, they are made part of the lesson plan library 317 stored within database 312.

In addition to the standard data in the lesson plan fields, the following advanced features are also available within the lesson plan module 316. These include a peer teacher rating system, average grade and standard deviation achieved by the specific lesson plan, feedback, suggestions and comments appending to the lesson plan notes, number of teachers using a lesson plan, similar lesson plans based on related state educational standards and lesson plans sorted by rating or usage and filtered by one or more specific educational standards.

The assignment module 318 allows for the creation of various assignments to accomplish the criteria established within a lesson plan. The assignments may be saved by the assignment module 318 for future use by the teacher and may also have an association with a particular state educational standard. The assignment stored within the assignment module 318 may be accessed by other teachers in generating assignments to accomplish related state standards. Assignments are entered by a teacher into the tracking system platform 302 via the assignment module 318. The assignment management module 318 tracks all of the work assigned by the teacher in a class. Assignments are linked to one lesson plan each and thus, to one or more state educational standards. Since assignment grades will be used as a measure of student performance for specific state standards, assignments should be designed to focus on and assess understanding of materials presented in the lesson plan In a further embodiment, the assignment module 318 may include an on-line questionnaire functionality. This will enable teachers to create custom multiple choice assignments on-line. Each question or problem in an assignment can be associated with a specific state education standard. Teachers would have the ability to create their own assignment tests to drill students at regular intervals to improve scores. Teachers will have a more detailed result from grades. Instead of performance based on assignment grades, they can be weighted on individual questions. Assignments can be graded automatically. If teachers can eliminate grading time, they will be allowed to concentrate more on teaching rather than grading. Assignments could be shared in the same way lesson plans are shared.

The tracking system platform 302 ensures that only authorized users are allowed to see their protected data. A few examples of permissions applied to assignment displays include teachers can manage assignments only for classes that they teach. Students may only have read only access to assignments in classes they take. Parents have read only permissions to assignments in classes taken by their children. School administrators have read only access to see how assignments in all classes within their school. District level administrators can see all assignments in all classes in all districts within their district. Grades for a student can be seen only by the student, the student's parents, the student's teacher for that specific class taught by the teacher and the school administrator. If a user is both a teacher and a parent, the user can manage all classes they teach. However, they only have read only access for classes they do not teach but are taken by the user's children.

The grade module 320 provides the ability to enter students' grades with respect to assignments that have been created and assigned by the teacher. The grade module 320 allows grades to be stored by assignment or by class depending upon the manner in which the teacher finds most beneficial. The information stored within the grade module 320 may be accessed by teachers, school administrators, parents and students to provide up-to-date information with respect to how a student is performing with respect to a particular class or particular state educational standard. Grades may be entered into the grade module 320 by two methods, by assignment or by class. Grade entry by assignment allows teachers to select an assignment and enter grades and other pertinent information for the entire class. Teachers can mark an assignment as late, turned in or exempt. Notes can be included next to each assignment that can be retrieved by students and parents viewing the assignment. Grade entry by class is a module that provides a specially formatted, fully functional on-line spread sheet. Teachers can enter grades into the on-line spreadsheet as if they were using any standard desktop spreadsheet application. In both cases, final averages for each student are automatically recalculated based on a new value entered into the system. Teachers can even test the effects of raising or lowering grades by several points on the student's final average. When students have submitted their assignments, the teacher may grade the assignments and enter the grades by assignment or via the grade module 320. If the teacher has created an on-line assignment, it will be graded automatically.

The grade module 320 provides teachers with the option to calculate student grades via three different methods. Point value assignments/non-weighted assignment types may be used wherein assignments are calculated on point values only. Assignment types are not weighted. Additionally, point value assignments/weighted assignment types may be used wherein assignments are calculated on point values only and assignment types are weighted based on teacher defined percentages. Finally, normalized assignment/weighted assignment types may be used wherein assignments are normalized to 100% before averaging. Assignment types are then weighted based on teacher defined percentages. These calculations would be used in all student averaging fields and all automatic real time calculations throughout the tracking system.

Finally, the report module 322 allows for reports to be created from all of the various data stored and obtained via the tracking system to provide real time and up-to-date feedback to specific individuals. The report module 322 enables a report to be created specific to the particular individual using the report. Within the report module 322, each user level has access to their own set of report types. For example, students have access to summary reports of their grades, performance trends and areas in need of improvement. Parents' reports are similar, but they are granted access to reports for all their children. If a school administrator were obtaining data with respect to the performance of their students district wide, the report module 322 could generate a very high level report illustrating the performance of students at the district wide level. Likewise, if a teacher were reviewing the performance of the students in her classes, report module 322 could be configured to provide a class level report for that particular teacher. The information provided by the report module 322 would be subject to various provisions such that only individuals authorized to have access to particular information would be granted access rights.

Teachers have a series of reports that summarize class grades, attendance, behavior and state education standards performance. The teachers' reports additionally show class performance compared to their other classes addressing the same state educational standards within the tracking system platform 302. Teacher reports show strongest and weakest students and calculate weakest overall education state standard performance. These provide just a few examples of the reports that may be generated if the right data is collected and stored in a useful manner. Numerous other data mining techniques may be used to obtain any type of report desired by a user. School administrators have similar reports that encompass all classes within a school. District administrators have reports that summarize information for all the schools within a district. State administrators have up to the minute reports summarizing results from all the districts within the state. These reports may be generated in real time as the data is received within the tracking system. Other types of reports include number of lesson plans per teacher, network usage and average online session times.

Addition modules 330 may provide other functionalities to the platform 302 with respect to behavior, attendance, class management, etc.

Using the tracking system platform 302, everyone involved in the education process can take advantage of access to real time information. Students will have their most current grades and instantly recognize their weakest areas. Parents won't have to wait for a progress report or report card to know their child's grades. Teachers will be able to help students most in need in the exact subject areas requiring assistance. Instead of hoping for the best during year-end assessment tests, teachers will be empowered to play an active part in improving state standards performance. School district and state administrators will have the most current data available to make critical decisions affecting their jurisdictions.

Referring now to FIG. 4, there is illustrated a flow diagram describing the overall process for generating reports on student performance using the tracking system described with respect to FIG. 3. The overall process consists of several independent steps. The steps should be followed in order for a first pass. However, each component may be used out of order at any particular time to perform a particular task assuming the necessary processes for operating the component have been achieved at some earlier time period.

Initially, the state standards are imported at step 402 using the import module 314. The state educational standards for a particular state are downloaded into the educational standards database 308 from a state standards website 304. The educational standards information on the state standards website 304 is publicly available and accessible via the Internet. However, in alternative embodiments, the state standards information could be obtained and manually entered into the educational standards database 308 using any known data entry technique rather than downloading via the Internet. In a preferred embodiment, the state standards are automatically downloaded into the state standards database 308. This enables the educational standards database 308 to be continuously updated with current information. However, it is also possible to manually perform this operation. The automated method merely comprises the manual method executed by a system server at regular intervals.

The step of importing state standards is required to ensure that the tracking system has an updated version of a state's publicly available educational standards. To be useful, the state's educational standards must be converted from their existing format into a relational database format for storage within the educational standards database 308. In most cases, each state publishes their educational standards in an HTML (hypertext markup language) format or an XML (extensible markup language) on their educational state agency website. However, other formats may be used. The state agency keeps these standards up to date with the latest version.

Next, the school district data is loaded into the school district database 310 at step 404. This data encompasses, for example, class information, class schedules, teacher and student information, parent student relationship records, and many additional sets of information. This data enables the tracking system to organize and track all relevant school information. Each district and/or school entered into the tracking system usually has a different source data structure. The data structure across different states, districts and schools varies greatly, and the methods for loading data into the standards database 308 changes depending upon the source data. The school district database 310 has a structure that is built to dynamically handle these various structures and allows for quick loading of millions of records. This data load results in a system with log in accounts for every teacher, parent, student and school administrator for a district or school. All classes and schedules are ready to use. Administration utilities are available for school administrators to handle class schedule and student record changes manually.

The data structure across different states, districts and schools varies greatly, and the methods for loading data into the standards database 308 changes depending upon the source data. The school district database 310 has a structure that is built to dynamically handle these various structures and allows for quick loading and maintenance of millions of records.

The school district database 310 is organized into a hierarchy of Roles and Domains as shown in FIG. 3*a*. A user in the system is assigned a username and password to access their account. Each account can be assigned to a set of security groups or Roles. Each Role can be given access to a specific set of tools/modules within the system. These tools are used to view or manage data within a specific Domain. A higher level Role (the System Administrator) can delegate management of sub-domains to lower level Roles (the District System Administrators). This delegation empowers Roles at different levels to maintain data within their respective Domains. With this simple hierarchical design, the initial load of school district data can be quickly loaded into a relational database. The labor involved in maintaining the large amount of data can be divided between the roles responsible for generating and maintaining the data. Administrators and decision-makers have immediate access to relevant summary data. Parents have access to their children's data.

In the system, the top level Domain is the Super District 380. The top level Role is the System Administrator 382. The System Administrator Role has access to view or manage all the data contained within all the Super Districts 380. The database 310 can contain one or more Super District Domains 380 and one or more System Administrators 382. Each Super District Domain 380 contains one or more School District Domains 384 which correspond to real, independent school districts in the system. The Superintendent Role 386 can be used to view any data contained within their School District Domain 384. The District System Administrator Role 385 has access to view and manage all data contained within the School District Domain 384.

Each School District Domain 384 can contain one or more Campus Group Domains 388 each with an assigned Central Office Supervisor Role 390. For example, a school district may have one person responsible for all high schools, one person responsible for all middle schools and a person responsible for all elementary schools. Each Campus Group Domain 388 can contain one or more Campus or School Domains 392. Each School Domain 392 contains one or more Class Domains 394. School Domains 392 are assigned a Principal Role 395 and other administrative roles. Class Domains 394 are assigned Teachers 396 and contain Students 397. Parents 398 are linked to one or more Students 397. Students 397 are linked to one or more Parents 398. Teachers 396 and Students 397 are linked to multiple Classes 392. This data load results in a system with login accounts for every teacher, parent, student and school administrator for a district or school.

Referring now back to FIG. 4, lesson plans are generated at step 406. This is required before class work may be generated. The lesson plans are short instructor guides created and shared by teachers to target lessons to one or more specific state educational standards. Next, class work is assigned at step 408. By using the lesson plan library, teachers can tailor each class to target understanding of concepts within the state educational standards. Class assignments are created and logged into the system. These assignments are either associated with a lesson plan or related directly to a state educational standard. Once assignments are completed and submitted to the teacher, the teacher can grade the assignments at step 410 and record their scores in an on-line grade book. Additional environmental factors such as student behavior, attendance and teacher activity are also tracked for future analysis. Finally, reports may be created at step 412 from all of the obtained data. At this stage, the tracking system will have a record of grades linked to specific students and their demographic information. These grades are also linked to lesson plans and state educational requirements. Thus, as grades are recorded into the tracking system, a real time measurement of student state standard performance related to specific demographics and categories is developed.

Referring now to FIG. 5, there is illustrated how a table of state educational standards 502 may be linked with lesson plan tables 504 created by the lesson plan module 316 and assignment tables 506 created by the assignment module 318. The state educational standards tables 502 are linked to the lesson plan tables 504 and assignment tables 506 such that when a lesson plan or assignment is created it can be associated with one or more state educational standards. Likewise, state educational standards may be linked to one or more lesson plans or assignments.

Figure 6:
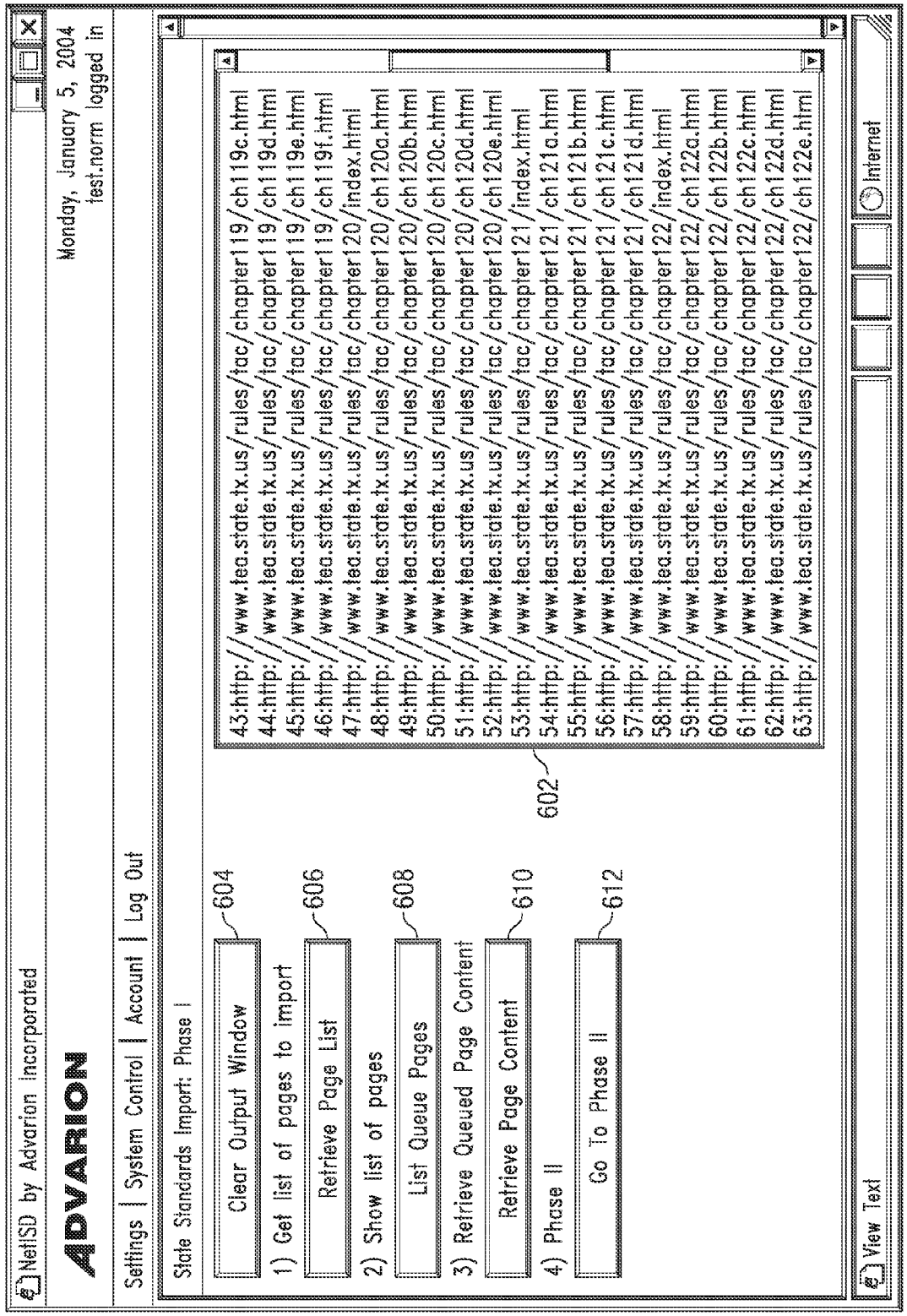
FIG. 6 illustrates the Phase I user interface for downloading educational standards.

Referring now to FIG. 6, there is illustrated a graphical user interface presented by the import module 314 for the Phase I view enabling the retrieval of updated state educational standards raw source data. These graphical user interfaces would be presented by the import module 314 in conjunction with the tracking system platform 302. The Phase I view consists of a set of control buttons on the left portion of the screen and an output window 602 on the right portion of the screen. As each of the control buttons are pressed, a step in the import process is completed and the results are displayed in the output window 602. The first control button comprises the clear output window button 604. This button 604 clears the contents of the output window 602 of the previously displayed information and provides a blank window. The retrieved page list button 606 enables the tracking system platform 302 to check a state agency's website or other source for a list of all available state education standard files. The file names are filtered out and stored into a download queue. The list queue pages button 608 provides a list of the queued contents within the download queue. This enables assurances that the proper file list is available and has been successfully retrieved. The data illustrated in FIG. 6 comprises a queue list. The retrieved page content button 610 enables the download of a copy of all files to a local database as flat text files. Finally, the go to Phase II button 612 enables the process to pass on to Phase II and display the graphical user interface illustrated in FIG. 7.

Figure 7:
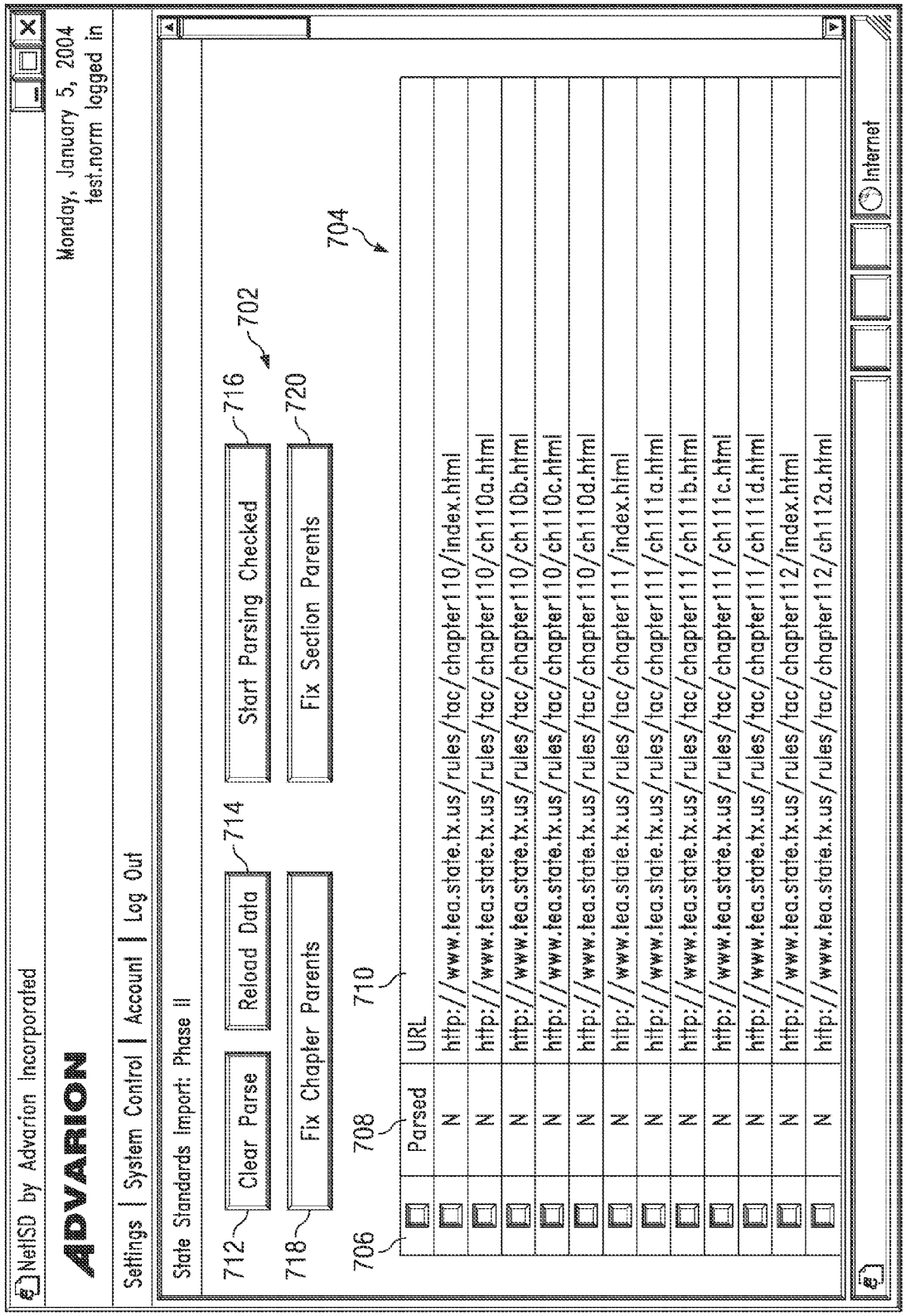
FIG. 7 illustrates the Phase II interface for downloading educational standards.

FIG. 7 illustrates the graphical user interface wherein state educational standard files may be parsed and imported by the import module 314. The Phase II view consists of a control button area 702 and a list 704 of queued files obtained in Phase I. The queued file list 704 includes three columns, a check box selector 706 for selecting files which are to be parsed by the tracking system platform 302. A parsed status column 708 provides an indication of whether or not a file has presently been parsed by the system. Finally, a queued file URL 710 provides a web address of a file to be downloaded and parsed by the tracking system platform 302. Files are selected for processing by clicking the desired file's check box 706. As each file is processed, the parsed status will change displaying either a parsing success or failure. The clear parse button 712 clears the parse list 704 of all queued files. The Reload data button 714 enables the reloading of queued files within the queued file list 704. The start parsing check button 716 begins the procedure of processing each of the files that have been checked within their associated check box 706. The fixed chapter parent button 718 automatically searches for errors in the chapter listing for the state educational standards and corrects any located errors. The fixed section parent button 720 enables automatically searches for errors in the section listing for the state educational standards and corrects any located errors. Rather than having buttons to correct and find chapter and section errors, buttons may be configured to find and correct errors for any identification hierarchy used by a state educational standard. The contents of a raw source data file may be viewed by checking on an associated file name in the URL column 710. Rows will be illustrated in red if they were unable to complete the parse process due to user interruption of the process, a source data file that was nonstandard, obsolete or informational only or a source data file that contained an error. Rows will be shown in green for files that were successfully parsed.

Figure 8:
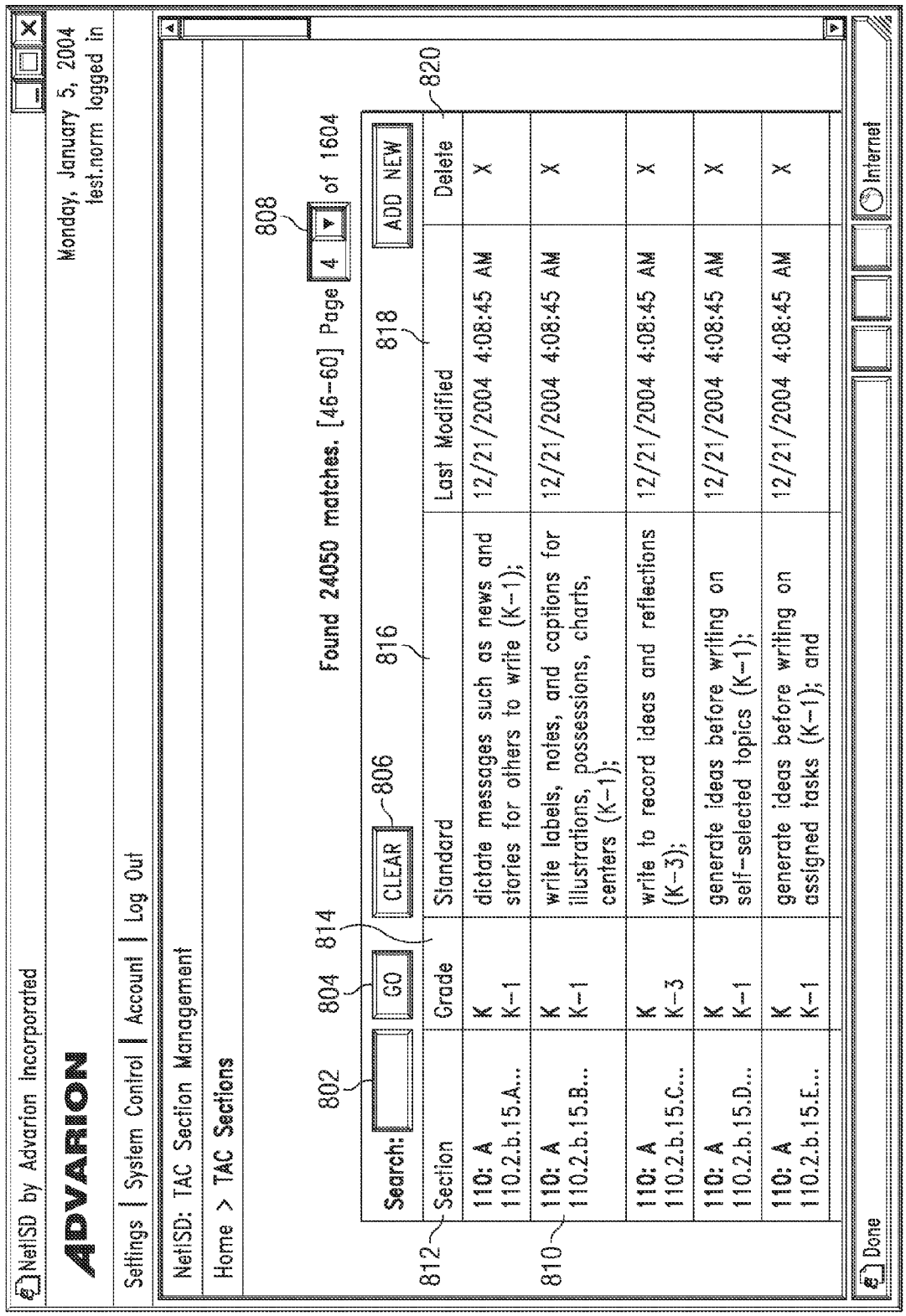
FIG. 8 illustrates the graphical user interface for displaying accessed state educational standards.

Once the source files have been successfully parsed, the results may be viewed using the graphical user interface illustrated in FIG. 8. FIG. 8 illustrates the state educational standards that have been accessed from the updated educational standards database 308. A search field 802 enables a user to search through the listed educational standards to locate a particular one. The go button 804 initiates the search process while the clear button 806 clears the search field 802. A page selector field 808 enables a user to go to any particular page of obtained search results. The display window 810 displays the resulting educational standards obtained by a search. The section column 812 provides an identifier for the obtained educational standard. The grade column 814 provides an indication of the school grade with which the standard is associated. The standard column 816 provides a brief description of the standard. The last modified column 818 provides an indication when the standard was last updated within the database 308. Finally, the delete column enables deletion of a highlighted standard from the database.

Referring now to FIG. 9, there is illustrated a flow diagram describing the process by which state educational standards may be imported using the import module 314. The process is initiated at step 902 by selecting the import utility module 314. The output window 602 of the Phase I screen is cleared at step 904 of any previously displayed data. The system retrieves a listing of all available state educational standard files at step 906. These file names are filtered and stored within a download queue at step 907. The queued pages are listed at step 908 to enable a user to confirm that the proper file list is available. The state standard files are retrieved at step 910 and downloaded into a local database as flat text files from the state website. The process proceeds at step 912 to Phase II. Within Phase II, the particular state files to be processed are selected at step 914. These files are parsed at step 916 to parse the files for pertinent data and save this information in a relational database structure into database 308. Once the data has been parsed and saved, the results may be viewed at step 918.

Referring now to FIG. 10, there is illustrated how the lesson plan tables 1002 created by the lesson plan module 316 are linked to user tables linked the various teachers which may access the system. The lesson plan tables 1002 are further listed to state educational standard tables 1006 containing lists of the various state standards to be applied in the creation of lesson plans, and the assignment table 1008 describing the various assignments created responsive to the lesson plans. Finally, the lesson plan tables are linked to a classes table 1010 indicating the classes with which various lesson plans are to be applied.

This structure allows many lesson plans to be assigned to a state educational standard and many state educational standards to be assigned to a lesson plan. The structure establishes the teacher responsible for the lesson plan as well as the classes that should see the particular lesson plan. It allows multiple assignments to relate to a single lesson plan. Finally, assignments are purposely limited to only one lesson plan per assignment. The structure can be changed to allow multiple ownerships of a lesson plan. Likewise, if teachers deem it necessary to assign reference multiple lesson plans for a single assignment, the lesson plan assignment structure can be changed as necessary.

Referring now to FIG. 11, there is illustrated the lesson plan list view. The lesson plan module 316 provides two views, a list view and an edit view. The list view enables teachers to search their lesson plans by subject, status or key word. The results are sorted by status, lesson plan title or last modified date. The search filters section 1102 enables a teacher to enter information to be searched by state educational section within a state educational field 1104. Alternatively, the teacher may enter specific search terms within a search term field 1106. The results field 1108 includes a check box field 410 for selecting a particular lesson plan for further review. A status field 1112 enables a user defined status for the lesson plan to be established. The status may take any form desired by the user. A lesson plan field 1114 provides a short description of the lesson plan title and a summary. The last modified field 1116 provides an indication of the point in time in which the lesson plan was last modified.

When a lesson plan is selected, added or deleted, the edit view is displayed as illustrated in FIG. 12. The edit view enables a teacher to view a lesson plan in detail and delete, edit or generate the lesson plan. The title field 1202 enables the teacher to provide a particular title for the lesson plan being created or edited, which is used for quick searches and as the header of the lesson plan. The synopsis field 1204 enables a teacher to provide a short summary of the lesson plan that is being created or edited. The status field 1206 enables the teacher to provide an indication of whether the lesson plan is active, completed, pending or inactive. A share lesson plan field 1208 enables the teacher to indicate whether this lesson plan should be shared with other teachers. The created field 1210 indicates when the lesson plan was initially created, and the last modified field 1212 provides an indication of when the lesson plan has been most recently modified. The primary lesson plan section field 1214 enables the teacher to select the particular state educational standard section with which the lesson plan is associated. The associated state standards field 1216 provides an indication of the state standards which are associated with the selected primary standard within the section. The lesson plan detail section provides an objectives field 1218 for the user to enter the particular objectives to be achieved by this lesson plan. The method field 1220 enables the user to enter the particular methodologies which are going to be used to achieve the lesson plan goals. Finally, the concepts field 1222 may be used to enter the various concepts and materials which are going to be taught using the lesson plan. The assessments field 1224 provides a description of the assignments that may be used to assess understanding of the lesson material. The resources field 1226 provides a list of textbooks, handouts, notes and other resources used in teaching the lesson. The links field 1228 provides a list of web sites and tracking system links related to the lesson. The notes field 1230 provides additional information relating to the lesson.

FIG. 13 is a flow diagram illustrating the process by which a teacher may view existing lesson plans. A teacher may view their lesson plans and share lesson plans by going to the teacher menu at step 1302 and selecting the lesson plans button at step 1304. The lesson plans may then be filtered, searched or sorted at step 1306 as desired by the teacher. The lesson plans may be filtered by state educational standards subject, current user only, shared only and/or lesson plan status. By entering a search term, the teacher may find a specific lesson plan including the entered term. By sorting the lesson plans by status, title or last modified, the teacher finds lesson plans in this method.

Referring now to FIG. 14, there is illustrated a flow diagram describing the process by which a teacher may create or edit a lesson plan. The process is initiated by selecting the teacher menu at step 1402 and selecting lesson plans at step 1404. The teacher selects the add new option to add a new lesson plan or selects an existing lesson plan to edit at step 1406. The teacher completes or edits a number of fields associated with the selected lesson plan at step 1408.

Referring now to FIG. 15, there is illustrated the process for linking a state standard to a particular lesson plan. A lesson plan subject is selected at step 1502. The state standards are retrieved at step 1504 by clicking on the add button to bring up the add state standard lesson plan pop-up menu. A state standard is selected at step 1506 from the provided menu of state standards. By selecting the apply button, the state standard may be applied to the lesson plan at step 1508. Multiple state standards may be associated with any particular lesson plan. Once the user has completed adding all applicable state standards to a lesson plan, the lesson plan may be closed at step 1510. Similarly, state standards may be removed by clicking on the X within the remove column next to each state standard as illustrated in FIG. 11

Referring now to FIG. 16, there is illustrated how assignments may be related to a number of other data item tables within the tracking system platform 302 including assignment tables 1602 of the assignment module 318, user tables 1604, state educational standards 1606, lesson plans 1608, classes 1610 and student grades 1612. The assignment tables 1602 are entered through the student grade table 1612 to the student user tables 1614. Assignments are structured similarly to lesson plans. Assignments can be assigned to any number of state education standards. Assignments can be related to teachers and classes structurally the same as lesson plans. Typically, teachers associate an assignment with a single lesson plan. State educational standards associated with that lesson plan are inherited by the assignment. The key difference is that assignments are associated with the student grades table 1612. The student grades tables 1612 include links to the students in the student user table 1614, the grade earned for the assignment and other various fields.

Referring now to FIG. 17, there is illustrated the teachers class list screen a graphical user interface for providing a teacher with access to created assignments. Several graphical user interfaces are involved in the management of assignments by a teacher. Teachers must select a class to view in the teachers class list as illustrated in FIG. 17 in order to gain access to a particular assignment. Once a class has been selected, teachers can add, edit, delete and grade assignments in their classes. The teachers class list screen includes a teacher field 1702 for listing the particular teacher whose class list is being accessed. The semester field 1204 displays the semester for the class list. The grading period field 1706 provides the teacher with the ability to select the grading periods which are going to be displayed within a class list area 1708. The class list area 1708 includes a period column 1710 for listing the period associated with a particular class. The class information field 1712 provides a short description of the particular class. The assignments field 1714 describe the assignment, and the attendance field 1716 indicates the attendance within the particular class. From the class list, teachers can edit class information by clicking on a class title within the class information column 1712, manage assignments for the class and manage behavior for the class.

Once the teacher has selected a class, the assignments list screen will appear as illustrated in FIG. 18. The assignments list screen includes a general information section 1802 including a roster field 1804 indicating the number of students within a particular class and a view link 1803 enabling the individual students to be accessed. The semester field 1806 indicates the semester for a particular class, and the class field 1808 enables the title of the class to be entered. The period field 1810 enables the period at which the class occurs to be listed, and the instructor field 1812 enables the class instructor to be listed. The assignment table 1814 includes a listing of all assignments for the class. A graded column 1816 provides an indication of whether the assignment has been graded by the teacher. The assignments column 1818 provides a title of the assignment and a short description thereof. A details link 1820 within the assignment column provides more detailed information on the assignment. The grade assignment button 1822 enables the teacher to grade the assignment. A scoring column 1824 provides for the maximum scoring on the assignment and an assigned column 1820 provides an indication of when the assignment was assigned. A due date column 1828 provides an indication of when the assignment was due. The delete column 1830 may be used to delete the assignment by clicking on the X 1832 located therein. An add new assignment button 1834 enables the teacher to enter additional assignments.

An assignment filter window 1836 provides various fields for enabling a teacher to search through the assignments within the assignments table 1814. These include the grade period filter 1838 enabling selection of a grade period, the assigned filter 1840 indicating when the assignment was made, the search filter 1842 enabling indication of a particular search term, the graded filter 1844 indicating whether or not the assignment has been graded, the due date filter 1846 indicating when the assignment was due and the types filter 1848 indicating the type of the assignment. The search button 1850 initiates the search according to the established filters within the filter fields. The clear button 1852 clears previously entered filter data. From the assignment list view, teachers can filter assignments by grading period, assigned date, due date, assignment type or graded status. Key words can also be used to find a particular assignment. To edit assignment detail, the teacher can click on the assignment name within the assignment column 1818 or the details link 1820 under each assignment. To grade an assignment, the teacher can either select the grade assignment book or the grade assignment view 1822. Clicking on the view link 1803 in the general information block will show the roster of students in the class along with their e-mail address. Teachers may also add or delete assignments from this view.

Figure 19A:
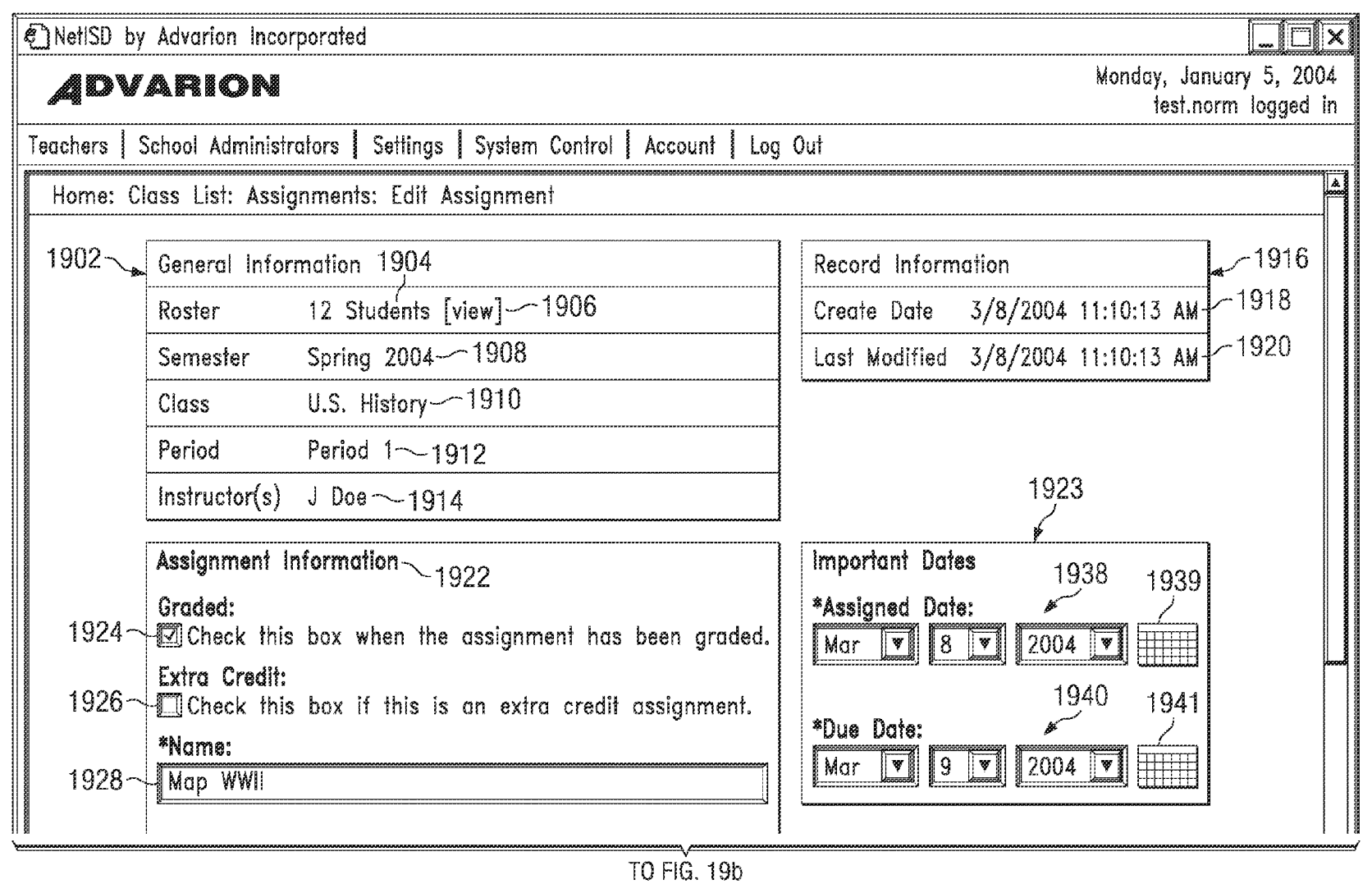
Figure 19B:
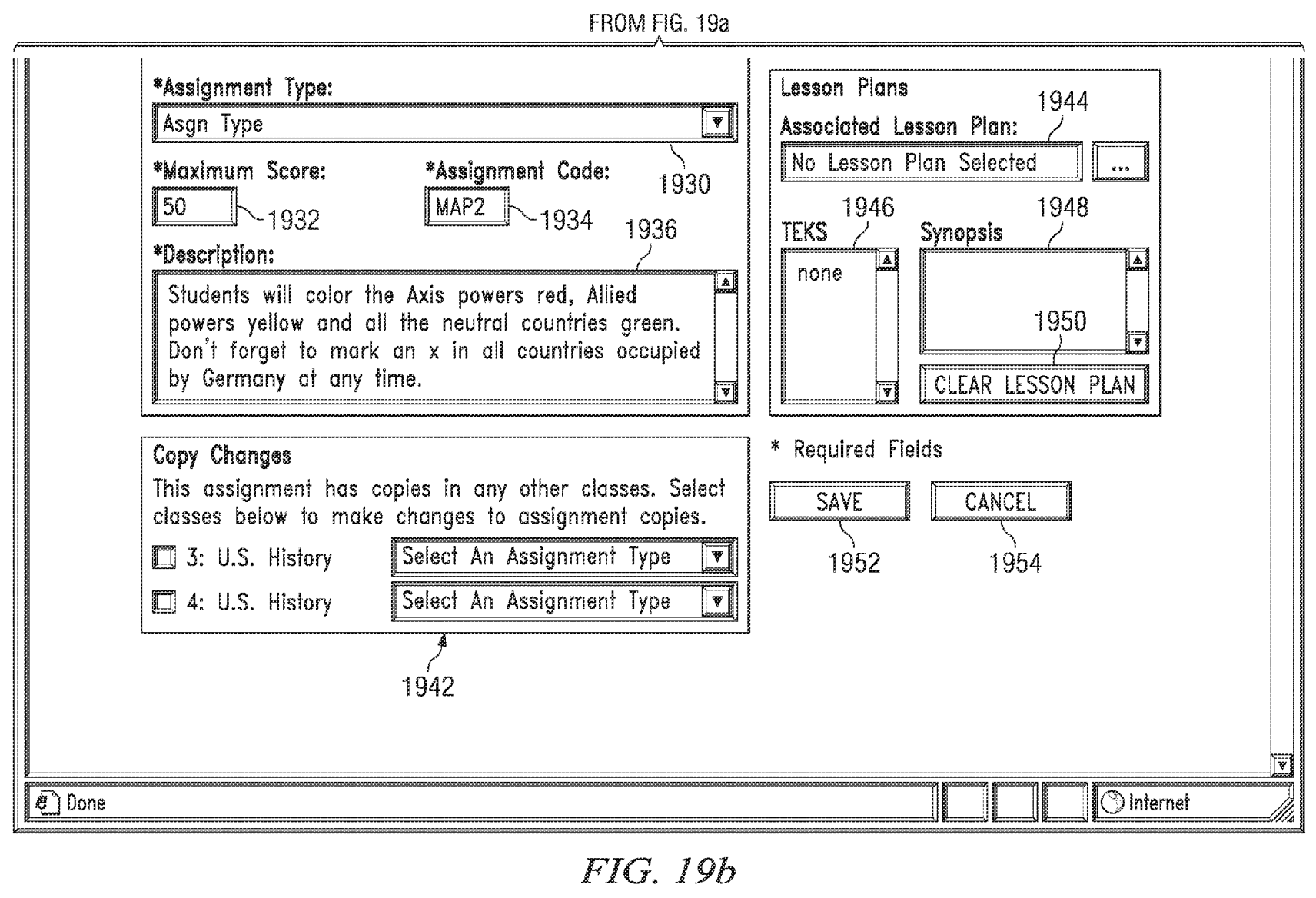

Once the teacher has selected an assignment, the edit assignment view as illustrated in FIG. 19 will appear. From this screen, the teacher can manage all aspects of an assignment including related state educational standards and lesson plans. The assignment edit window includes a general information section 1902 including a roster field 1904 listing the number of students in a particular class associated with the assignment. A view link 1906 enables the teacher to view the roster of students and an associated e-mail address. The semester field 1908 lists the semester of the class and the class field 1910 provides a title for the class. A period field 1912 provides an indication of the period in which the class occurs and the instructor field 1914 provides the instructor for the class.

The record information section 1916 provides a create date field 1918 indicating when the assignment was created and a last modified field 1920 indicating when the assignment was last modified. The assignment information section 1922 and the important dates section 1923 include various data fields associated with the assignment. The graded field 1924 provides a check box for indicating when an assignment has been graded. The extra credit field 1926 provides a check box for indicating that the assignment is an extra credit or optional assignment. The name field 1928 provides for entry of a unique and descriptive title for the assignment. The assignment type field 1930 allows for the entry of the type of assignment as defined by the teacher. The teacher has the ability to define any number of assignment types. Example categories for assignment types include homework, quiz, test, class participation, reading or projects. Additionally, teachers can assign percentage weighting factors to each assignment type. The maximum score field provides an indication of the maximum allowable score before bonus or extra credit points. The assignment code field 1934 comprises a short five character code to uniquely identify the assignment. This is used by other modules that must display the assignment within the confines of narrow columns. The description field 1936 provides for entry of a full description of the assignment including textbooks required, page numbers, question numbers, etc. The data entered must be adequate to describe the assignment to students, parents and school administrators. The assigned date field 1938 comprises the date that the assignment was given to the student. The date can be selected by either selecting the month, day and year separately in each drop down menu or by clicking on the calendar icon 1939. The due date field 1940 provides the date that the assignment is due back to the teacher for grading. The due date could be selected via the drop down menu boxes or by selecting the monthly calendar icon 1941.

The copy changes section 1942 is a special feature enabling teachers to replicate the assignment to other classes taught by the same teacher of the same subject. This enables the teacher to create an assignment once for use in several classes that they teach. This link ensures that any changes made to one assignment are also replicated to the sister copies of the assignment in other classes. The associated lesson plan field 1944 enables the user to select the lesson plan with which the assignment is associated. The TEKS field 1946 provides for selection of the particular state standard (in this use a Texas standard, however, any state standard may be used) with which the assignment is associated. The synopsis field 1948 enables the teacher to succinctly define the purpose of the assignment with respect to the associated state standards selected in field 1946. The clear lesson plan button 1950 enables the teacher to delete the information in the lesson plan. The save button 1952 allows the user to save the created lesson plan, or alternatively, the lesson plan field entries may be cancelled using the cancel button 1954.

Figure 20:
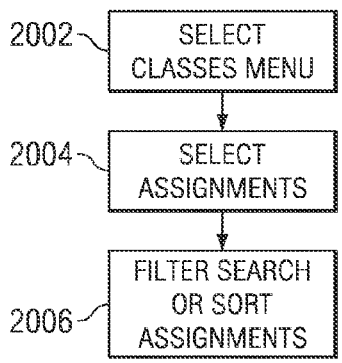
FIG. 20 is a flow diagram illustrating the manner for viewing assignments.

Referring now to FIG. 20, there is illustrated a flow diagram describing the manner in which a teacher may view assignments. The teacher selects the classes menu at step 2002 and selects assignments at step 2004 for the desired class. Teachers could additionally select behavior and attendance records for a specific class from the classes menu selected at 2002. The selected assignments are managed by filtering assignments by any available filtering field, searching on a particular term or sorting assignments by graded status, assignment title or due date at step 2006.

Figure 21:
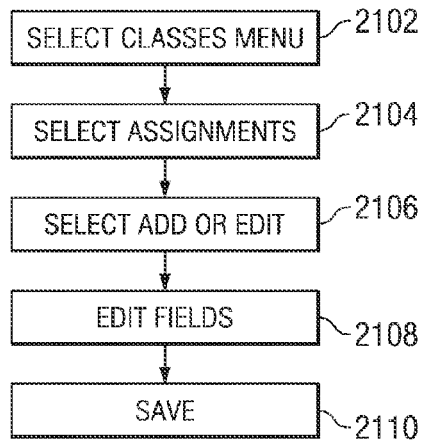
FIG. 21 is a flow diagram illustrating the manner for creating and editing assignments.

Referring now to FIG. 21, there is illustrated a flow chart describing the manner in which a teacher may create and edit assignments. Again, the process is initiated by selecting the classes menu at step 2104 and selecting the assignments at 2104 for the desired class. The teacher selects at step 2106 to add a new assignment or to edit an existing assignment. The teacher will edit the fields of the assignment described previously at step 2108 to achieve the desired assignment and save this at step 2110.

Figure 22:
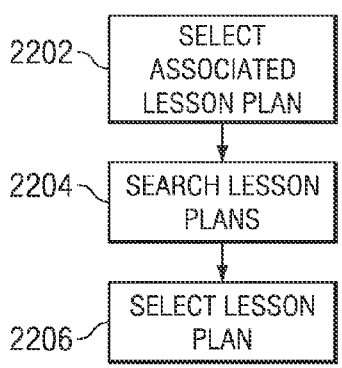
FIG. 22 is a flow diagram illustrating the process for associating a lesson plan with a particular assignment.

Referring now to FIG. 22, there is illustrated a flow chart describing the process for associating a lesson plan with a particular assignment. The associate lesson plan button is selected at step 2202 from the class list screen to bring up the select lesson plan dialogue window. The teacher will search at step 2204 through the provided lesson plans to find the desired lesson plan. The appropriate lesson plan is selected at step 2206 by clicking the select button. The selected lesson plan title will appear in the assignment window along with a list of associated state educational standards in the lesson plan synopsis. To remove the lesson plan associated from the assignment, the user clicks the clear lesson plan button 1950.

Figure 23:
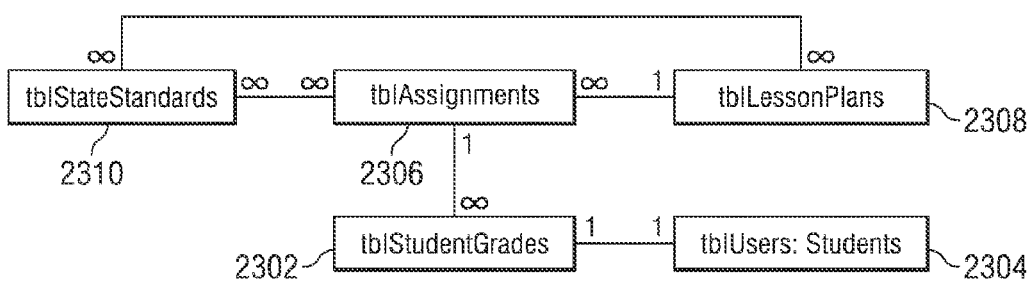
FIG. 23 illustrates the linkage between the assignments data table and various other data tables within the tracking system.

Referring now to FIG. 23, there are illustrated various linkages between grade table 2302 of the grade module 320 and other tables. The student grades table 2302 is linked to the student user tables 2304 to enable students access to their grades. The student grades table 2302 is also provided access to the assignments table 2306 to enable grades to be associated with particular assignments. The lesson plans table 2308 and state standards table 2310 also have access to the student grades table 2302 via their access to the assignments table 2306.

Figure 24:
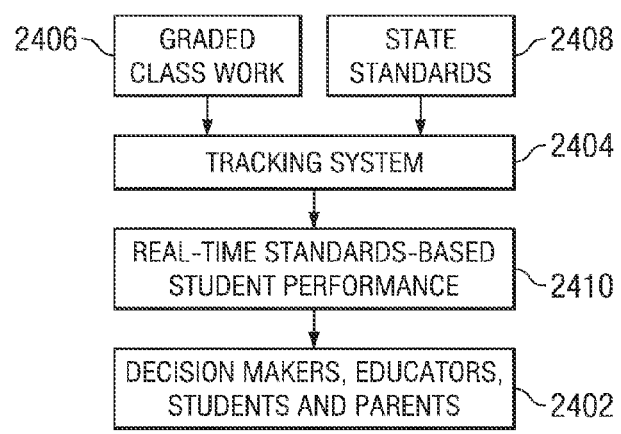
FIG. 24 illustrates a top level diagram of the manner in which the tracking system may be used by decision makers.

Referring now to FIG. 24, there is illustrated a top level diagram as to how the tracking system information may be used by decision makers, educators, students and parents 2402. At this stage, the tracking system 2404 will have provided thereto graded class work information 2406 related to students and assignments. The assignments are related to lesson plans and the lesson plans are related to one or more state educational standards 2408. Given that student records are linked to demographic data and other measurements such as behavior and attendance, aggregate summary data can be obtained more easily. More importantly, this aggregate data (data broken down by various demographics and other factors) can be pulled from the accumulated linked information. Thus, real time standards based student performance data 2310 may be used by various decision makers 2402. Thus, standard relational database techniques can be used to data mine a number of useful statistics to help everyone from parents to teachers to school administrators to make more informed educational decisions.

As soon as an assignment grade is saved, students may see their grades and progressive average immediately. Additionally, teachers, school administrators and state officials can instantly analyze state education standards student performance without waiting for a year end test. State level decisions can be made in real time with up to the minute information. With existing system, states base their executive decisions on performance reports that may be at least two years old. The assessment tests are taken at the end of the school year and the outsourced testing company can take up to three months to report individual student test scores. The advantage of real time standards based student performance information can obviously be seen in light of these existing delays.

FIG. 25 illustrates the user screen used for grade entry by the assignment module 318. Teachers use the grade entry by assignment screen illustrated in FIG. 25 when they want to have finer control over the individual grades and additional fields for a specific assignment. The assignments screen includes a general information section 2502 including similar information fields to those discussed herein above. Student name field 2504 provides for the display of the student name based on the school's security setting. Some schools opt for a unique ID number or first name only displays. The average field 2506 provides the real time student final grade average for the class. The number is updated as the number in the grade column changes. The grade field 2508 provides for a field for the teacher to enter the student's grade for an assignment. The late field 2510 enables for an indication that an assignment has been turned in late. The turned in field 2502 provides for an indication that an assignment has been turned in before it has been graded. This enables students and parents to see if an assignment was successfully turned in and received on time. The exempt field 2514 enables the teacher to exempt students from particular assignments. This field 2514 ensures that a student is not penalized for non-submittal of assignments from which they have been exempted. The notes field 2516 is a space wherein a teacher may append comments to the grade record. The assignment details section 2518 contains a number of fields with general information about an assignment including the assignment name, the assignment type, the due date of the assignment, whether or not the assignment has been graded and the maximum grade for the assignment. The set grade max button 2520 enables the teacher to set all grades to the maximum assignment grade. The set grade min button 2522 sets all grades to zero. The turn in button 2524 toggles all the turned in check boxes on and off. The save button 2526 enables entered grades to be saved and the cancel button 2528 allows grades to be canceled.

Referring now to FIG. 26, there is illustrated a flow diagram describing the entering of grades through the assignment screen. After selection of the class menu at step 2602, the teacher selects the assignment at step 2604 for the desired class. The grade assignment button is selected at step 2606 for the assignment to be graded. The teacher enters the grade data associated with the assignment at step 2608 and once the grade data has been entered, provides a check within the graded check box at step 2610 to indicate that the assignment has been graded. Once this grade data information has been selected it may be saved at step 2612.

Teachers use the class grade book as illustrated in FIG. 27 when finer control over the grades is not necessary. Grades for multiple assignments can be entered quickly into a spreadsheet type environment. The grade entry by class screen includes a general information section 2702 including general information as described previously herein above. A grade summary section 2704 includes a summary of the number of assignments that have been graded in field 2706 and a class average field 2708 indicating the average of the class. Section 2710 includes a list of each of the students within a particular class. The class average for the student is indicated in column 2712. Each particular assignment within the grade book is indicated by a due date 2714, assignment type 2716 and an assignment code 2718. The weighting of a particular assignment with respect to the overall class average is indicated at 2720. The grade for an assignment may be entered in grade entry fields 2722 for each student on each assignment. The grade averages within the average column 2712 is automatically updated upon each grade change. The last row of the grade entry screen contains the grade average for a particular assignment. Assignments that are not graded are displayed in red and graded assignments are displayed in green. The grade summary at the top of the page shows the class average 2708.

Referring now to FIG. 28, there is illustrated the process for using the class grade book screen illustrated in FIG. 27. Upon selection of the classes menu at step 2802, the teacher may select the view grade book selection at step 2804. The user edits the grades within the grade book as desired at step 2806 and saves the entered grades at step 2808.

Referring now to FIG. 29, there is illustrated a sample demographics report on a specific state educational standard. The report includes a various listing of state educational standards in column 3002 and has scoring averages broken down by ethnicity and sex of the students. The summary view drop down menu 2904 enables the user to select the view the report will take and the demographics drop down menu 2906 enables the user to select various demographic combinations to be used such as the ethnicity/gender combo displayed in FIG. 29.

Referring now to FIG. 30, there is illustrated a flow diagram describing how a particular report may be viewed by a user. The user selects the reports menu at step 3002 and selects the particular type of report needed at step 3004. The summary review for the report is selected at step 3006 and the demographic view for the report is selected at step 3008. Finally, the go button is selected at step 3010 to initiate and display the desired report. Results are calculated for all state educational standards for all ethnicity/gender combinations. Each state standard can be open to drill down into more specific areas of the state educational standards.

Figures 31, 32:
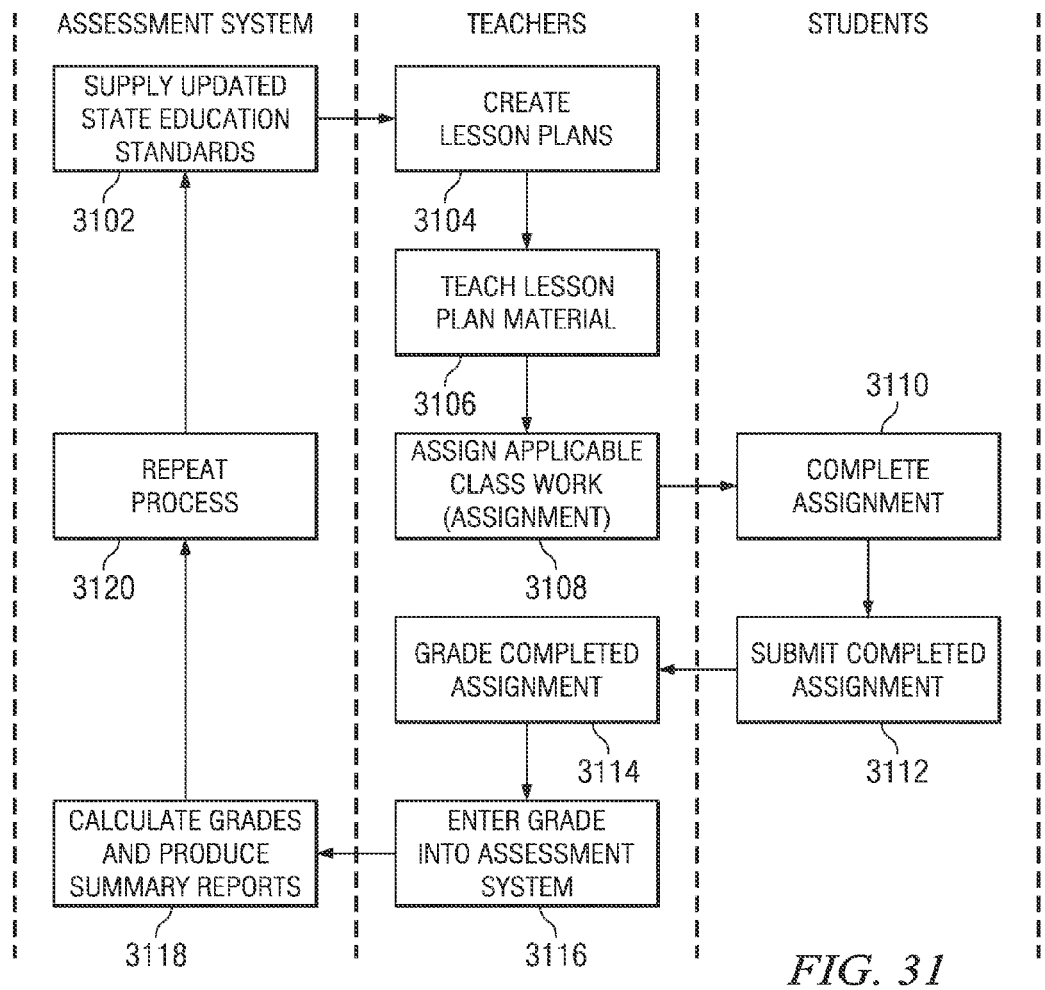
FIG. 31 is a flow diagram describing the overall process flow of the system platform.
FIG. 32 illustrates the manner in which the system provides real time data analysis responsive to the linkage of various input data.

Referring now to FIG. 31, there is illustrated a flow diagram describing the overall process flow of the tracking system platform described herein above. The tracking system platform 302 supplies updated state educational standards at 3102 that are used for the creation of various lesson plans associated with the standards at step 3104. Teachers teach a class to their students at 3106 using the generated lesson plan materials and assign applicable class work (assignments) at step 3108 related to the material just taught to the students. The students are responsible for completing their class assignments at step 3110 and submitting at 3112 the completed assignments back to the teacher for review and grading. Teachers will grade the completed assignments at 3114 and enter the grade for the assignment at 3116 into the tracking system grading module. The tracking system calculates grades and produces summary reports at step 3118 based upon the grades of the assignments and stored state educational standards and district information to produce these reports. The process may be repeated at step 3120 with each of the steps relying upon previously provided information from earlier iterations of the process.

Thus, using the above-described system, the situation as illustrated in FIG. 32 may be achieved. The first groups of collected data such as state educational standards 3202, student information 3204, demographic information 3206, lesson plans 3208 established by a teacher, assignments generated and graded by a teacher 3210 and student grades 3212 upon the particular assignments may be linked together and associated within the tracking system 3214 to provide an output of real time data analysis which may be used by teachers, parents, students and school administrators to gauge the students' performance against the measuring sticks of the state educational standards. The tracking system 3214 may provide real time analysis based upon each of the data components, or alternatively, may only utilize specific portions of data components such as lesson plans 3208 and student grades 3202 to perform analysis as to which particular types of lesson plans are being most successful with respect to the state educational standards 3202. The strength of the tracking system 3214 lies in the ability to provide any desired linkages between the data collected by the system and provides the real time analysis to the user of the system.

It will be appreciated by those skilled in the art having the benefit of this disclosure that this invention provides a real time performance assessment with respect to established educational standards. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A system for providing real-time reports on an application of pre-defined educational standards within schools, comprising:
    at least one database for storing a plurality of pre-defined educational standards established by a controlling entity, the pre-defined educational standards defining a list of material to be covered in a class by grade and subject matter; and
    a report module that generates real-time reports on student performance with respect to at least one of the plurality of pre-defined educational standards responsive to the recorded grades of the students for at least one assignment existing at any particular point in time, wherein the real-time reports may be user configured to provide information at a selected level of detail of a plurality of levels of detail, the plurality of levels of detail comprising at least two of a state level, a district level, a school level, a grade level, a subject level, a class level and a student level for selected education standards.

2. The system of claim 1 further including a lesson plan module enabling the user to create and store a lesson plan for a selected class and associate at least one of the plurality of pre-defined educational standards for the selected class with the created lesson for the selected class, the lesson plan sharable with other users.

3. The system of claim 1, further including an interface providing access via a computer network to a plurality of established pre-defined educational standards that may be downloaded to the at least one database.

4. The system of claim 1, wherein the plurality of control modules further include a first download module for downloading established pre-defined educational standards to the at least one database in a relational database format.

5. The system of claim 1 further including a grade module for recording grades of students with respect to a particular assignment and associating the grades with at least one of the plurality of pre-defined educational standards.

6. The system of claim 1, wherein the control modules further includes a second download module for downloading school district data into the at least one database.

7. An apparatus comprising:
    a computer readable storage media for storing instructions to program a general purpose computer;
    wherein, the instructions configure the general purpose computer to:
    store within at least one database a plurality of pre-defined educational standards established by a controlling entity; and
    generate real-time reports on student performance with respect to at least one of the plurality of pre-defined educational standards responsive to recorded grades of the students for at least one assignment existing at a particular point in time, wherein the real-time reports may be user configured to provide information at a selected level of detail of a plurality of levels of detail, the plurality of levels of detail comprising at least two of a state level, a district level, a school level, a grade level, a subject level, a class level and a student level.

8. The apparatus of claim 7, wherein the general purpose computer is further configured to create and store a lesson plan for a selected class and associate at least one of the plurality of pre-defined educational standards for the selected class with the created lesson for the selected class, the lesson plan sharable with other users.

9. The apparatus of claim 7, wherein the general purpose computer is further configured to record grades of students with respect to a particular assignment and associate the grades with at least one of the plurality of pre-defined educational standards, the pre-defined educational standards defining a list of material to be covered in a class by grade and subject matter.

10. The apparatus of claim 7, wherein the general purpose computer is further configured to download the plurality of established pre-defined educational standards via a computer network to the at least one database.

11. The apparatus of claim 7, wherein the general purpose computer is further configured to download the established pre-defined educational standards to the at least one database in a relational database format.

12. The apparatus of claim 7, wherein the general purpose computer is further configured to download school district data into the at least one database.

13. A method for providing real-time reports on an application of pre-defined educational standards within schools, comprising:
    storing within at least one database on a computer a plurality established pre-defined educational standards, the pre-defined educational standards defining a list of material to be covered in a class by grade and subject matter;
    recording grades of students with respect to a particular assignment on a computer;
    associating the grades with at least one of the plurality of pre-defined educational standards; and generating real-time reports on a computer on student performance with respect to at least one of the plurality of pre-defined educational standards responsive to the recorded grades of the students for at least one assignment existing at a particular point in time, wherein the real-time reports may be user configured to provide information at a selected level of detail of a plurality of levels of detail, the plurality of levels of detail comprising at least two of a state level, a district level, a school level, a grade level, a subject level, a class level and a student level.

14. The method of claim 13 further including the step of creating and storing a lesson plan for a selected class and associate at least one of the plurality of pre-defined educational standards for the selected class with the created lesson for the selected class, the lesson plan sharable with other users.

15. The method of claim 13 further including the step of downloading the plurality of established pre-defined educational standards via a computer network to the at least one database.

16. The method of claim 13 further including the step of downloading the established pre-defined educational standards to the at least one database in a relational database format.

17. The method of claim 13 further including the step of downloading school district data into the at least one database.

18. The method of claim 13 further including the steps of:
creating and storing assignments on a computer for selected classes; and
associating the assignments for the selected classes with at least one of the plurality of pre-defined educational standards.

19. A system for providing real-time reports on an application of pre-defined educational standards within schools, comprising:
at least one database for storing a plurality of pre-defined educational standards established by a controlling entity, the pre-defined educational standards defining a list of material to be covered in a class by grade and subject matter;
a lesson plan module enabling the user to create and store a lesson plan for a selected class and associate at least one of the plurality of pre-defined educational standards for the selected class with the created lesson for the selected class, the lesson plan sharable with other users;
a grade module for recording grades of students with respect to a particular assignment and associating the grades with at least one of the plurality of pre-defined educational standards; and
a report module that generates real-time reports on student performance with respect to at least one of the plurality of pre-defined educational standards responsive to the recorded grades of the students for at least one assignment existing at any particular point in time, wherein the real-time reports may be user configured to provide information at a selected level of detail of a plurality of levels of detail, the plurality of levels of detail comprising at least two of a state level, a district level, a school level, a grade level, a subject level, a class level and a student level for selected education standards.

* * * * *